(12) United States Patent

Brooks

(10) Patent No.: US 9,184,866 B1
(45) Date of Patent: Nov. 10, 2015

(54) DISTRIBUTED OPTICAL BLOCK MULTIPLEXER TOPOLOGIES

(71) Applicant: Paul D. Brooks, Weddington, NC (US)

(72) Inventor: Paul D. Brooks, Weddington, NC (US)

(73) Assignee: Time Warner Cable Enterprises LLC, New York, NY (US)

( * ) Notice: Subject to any disclaimer, the term of this patent is extended or adjusted under 35 U.S.C. 154(b) by 225 days.

(21) Appl. No.: 13/733,443

(22) Filed: Jan. 3, 2013

(51) Int. Cl.
*H04J 14/02* (2006.01)
*H04B 10/25* (2013.01)

(52) U.S. Cl.
CPC ........ *H04J 14/0219* (2013.01); *H04B 10/2503* (2013.01); *H04J 14/022* (2013.01); *H04J 14/0205* (2013.01); *H04J 14/0209* (2013.01); *H04J 14/0216* (2013.01)

(58) Field of Classification Search
CPC .............. H04J 14/0209; H04J 14/0205; H04J 14/0216; H04J 14/0219; H04J 14/022; H04B 10/2503
USPC .................................................... 398/82–85
See application file for complete search history.

(56) References Cited

U.S. PATENT DOCUMENTS

| 5,748,350 A * | 5/1998 | Pan et al. ......................... 398/87 |
| 6,687,463 B1 * | 2/2004 | Hutchison et al. .............. 398/83 |
| 7,043,159 B1 * | 5/2006 | Solheim .......................... 398/83 |
| 7,860,397 B2 * | 12/2010 | Mori et al. ...................... 398/85 |
| 2003/0128984 A1 * | 7/2003 | Oberg et al. .................... 398/83 |
| 2005/0025486 A1 * | 2/2005 | Zhong et al. .................... 398/79 |

* cited by examiner

*Primary Examiner* — Leslie Pascal
(74) *Attorney, Agent, or Firm* — Chapin IP Law, LLC

(57) ABSTRACT

An optical network includes a fiber optic link and one or more distributed block filter pairs. A given block filter pair includes a first block filter and a second block filter disposed at disparate locations along the fiber optic link. The first block filter of a respective pair is a bi-directional device that redirects optical carriers within a particular block wavelength range onto or off of the fiber optic link depending on a direction of the optical signals. The second block filter of a respective pair also is a bi-directional device that redirects carriers within the particular block wavelength range onto or off of the fiber optic link depending on a direction of the optical signal. The block filter pairs enable bi-directional communications over the fiber optic link between corresponding nodes disposed at different locations along the fiber optic link. Since the wavelength range in a block includes multiple carriers in both directions, the wavelength range in its entirety can be connected to a single subtended fiber and transmitted a significant distance before the carriers are separated and provided individual ports for connection to equipment. This feature thus provides multi-wavelength fiber conservation not only in the main fiber line as in conventional multi-wavelength systems, but in the subtended fiber lines as well.

22 Claims, 14 Drawing Sheets

DISTRIBUTED OPTICAL BLOCK MULTIPLEXER TOPOLOGIES

BACKGROUND

Early cable networks supported one-way broadcasting of television programs to subscribers. This was sufficient in the early days of television. Eventually, however, because the Internet has become so popular, subscribers now desire the ability to transmit as well as receive data over their network connections.

To accommodate subscribers' needs, conventional cable networks have evolved to enable subscribers to transmit more and more data in a reverse or upstream direction to a network. For example, via a device such as a cable modem, in addition to receiving data such as requested content for playback, a subscriber is now able to transmit data to remote locations over a network.

Because of inherent high bandwidth capability, fiber optic links are commonly used to convey data in both upstream and downstream directions. Expansion of fiber optic links and efficient use of such links can be challenging. In certain instances, bandwidth on installed conventional fiber optic links may be under-utilized.

BRIEF DESCRIPTION OF EMBODIMENTS

Embodiments herein deviate with respect to conventional techniques. For example, one embodiment herein is directed towards novel and more efficient use of optical resources in a shared network environment to facilitate distribution of data.

More specifically, as discussed herein, an optical network includes a fiber optic link and a so-called block filter pair. The block filter pair can be one of multiple block filter pairs in the optical network.

In one embodiment, the block filter pair includes a first block filter and a second block filter disposed at disparate locations along the fiber optic link. In general, the first block filter can be a bi-directional device that redirects optical carriers within a particular block wavelength range onto or off of the fiber optic link depending on a direction of the optical signal. That is, a group of optical communication carriers (each comprising an optical carrier (i.e., carrier signal) defined by its respective center wavelength) within an optical spectrum range assigned to the block filter can be separated into single carrier connections, after first being redirected off of the fiber optic link via the block filter. In a similar vein, the second block filter also can be a bi-directional device that redirects carriers (i.e., modulated carrier signals) within the particular block wavelength range onto or off of the fiber optic link depending on a direction of the optical carrier signal, for subsequent separation into individual optical carriers for reception and/or transmitter connection.

In one embodiment, there is a distinction between channels and so-called carriers. Channels refer to a spectrum "space" or "slot" of defined optical bandwidth; the channels exist without any light (i.e., optical carrier signal) being present. Carriers (i.e., modulated carrier signals) represent light energy of the information modulated onto a respective carrier wavelength present within the allocated channels.

Assume that the first block filter receives a first set of optical carriers within the particular wavelength range from a first multiplexer resource to which the first block filter is communicatively coupled. The first block filter inputs the first set of optical carriers received from the first multiplexer resource onto the fiber optic link downstream towards the second block filter. The second block filter receives the first set of optical carriers in the downstream direction on the fiber optic link. Because the first set of optical carriers falls within the particular block wavelength range assigned to the second block filter, the second block filter redirects the first set of carriers off the fiber optic link to a second multiplexer resource.

In an opposite direction, assume that the second block filter receives a second set of optical carriers within the particular wavelength range from the second multiplexer resource. The second block filter inputs the second set of optical carriers onto the fiber optic link upstream towards the first block filter. The first block filter receives the second set of optical carriers in the upstream direction. Because the second set of optical carriers resides within the particular block wavelength range assigned to the first block filter, the first block filter redirects the second set of optical carriers off the fiber optic link to the first multiplexer resource.

Redirecting multiple optical carriers within an assigned optical range is beneficial because a respective block filter (multiplexer) can support many service groups in a cable network environment.

Redirection of a block of spectrum (e.g., one or more modulated carrier signals) covering multiple channels is beneficial because the entire group of channels can then be connected across a single strand of fiber to a remote location where individual carriers are separated from each other so equipment can be connected. Prior techniques required a fiber for each channel from the main fiber to the remote equipment. This technique is of particular value as it conserves fiber resources in side-runs of fiber cable to equipment that only needs connection to the channels in the block. Other carriers not in the block are allowed to continue down the main fiber run to other equipment locations.

As further described herein, each of the first multiplexer resource and the second multiplexer resource includes a series connection of multiple optical filters and corresponding optical ports on which to individually receive the first set of optical carriers and individually output the second set of optical carriers. In accordance with further embodiments, another technique that could be used is the "prism-like" diffraction grating based device that separates channels all at once.

Note that any of one or more of the multiplexer resources as discussed herein can include: i) multiple optical input ports on which to receive a first set of optical carriers, ii) multiple optical output ports from which to output a second set of optical carriers, iii) at least one bi-directional optical port. Input and output ports are typically bidirectional, even if they are only used for carriers transmitted in one direction.

In one embodiment, the multiplexer filter resource can include a circulator resource. In such an instance, the circulator resource can be configured to receive carriers within a first set of optical channels from a multiplexer that combines light from multiple optical input ports. The circulator resource directs transmission of the first set of optical carriers out of the bi-directional optical port. The circulator resource can at the same time receive a second set of optical carriers as inputs to the bi-directional optical port. The circulator resource directs the second set of optical carriers to a connected multiplexer that separates the carriers into individual output ports of the multiplexer resource. In accordance with one embodiment, note that in the circulator configuration, the input and output multiplexers can be separate in optical terms, although they may physically packaged together.

An amplifier resource can be connected between the multiple optical input port multiplexer and the circulator resource. In such an instance, the optical amplifier resource amplifies the first set of carriers received on the multiple optical input ports. The circulator resource directs the amplified first set of carriers out of the bi-directional optical port to the first block filter disposed in series with the fiber optic link. Accordingly, signals received at optical input ports of the first multiplexer resource can be amplified and subsequently transmitted from the circulator resource to the first block filter and downstream on the fiber optic link.

These and other more specific embodiments are disclosed in more detail below.

As discussed herein, techniques herein are well suited for use in network applications. However, it should be noted that embodiments herein are not limited to use in such applications and that the techniques discussed herein are well suited for other applications as well, etc.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or one or more claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
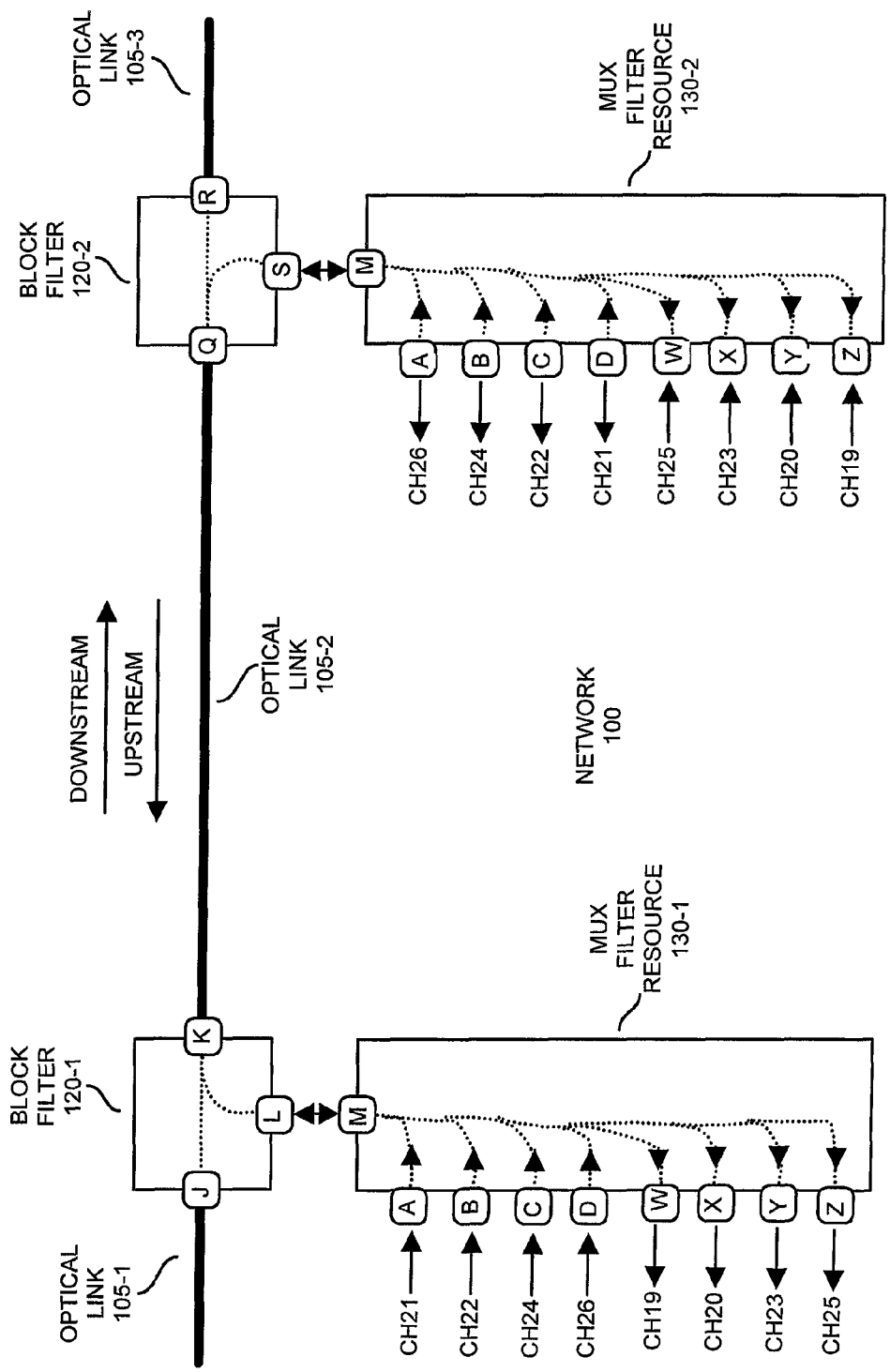
FIG. 1 is an example diagram illustrating an optical network including a block filter pair and respective multiplexer filter resources according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

FIG. 1 is an example diagram of a network according to embodiments herein.

As shown by way of a non-limiting example, network 100 includes one or more interconnection of optical links 105-1, 105-2, 105-3, etc. (collectively, optical link 105). Network 100 further includes block filter pair including block filter 120-1 and block filter 120-2. The block filter 120-1 can be substantially identical to block filter 120-2.

By way of a non-limiting example, the n 100 can be a passive optical network.

As shown, block filter 120-1 and block filter 120-2 are disposed at disparate locations along the optic link 105. For example, block filter 120-1 is disposed at one terminal end of optical link 105-2; block filter 120-2 is disposed at the other terminal end of optical link 105-2. Optical link 105-1 extends further upstream. Optical link 105-3 extends further downstream.

Each of the block filters 120 redirects optical carriers within a particular block wavelength range onto or off of the fiber optic link depending on a direction of the optical signal.

For example, the block filter 120-2 can receive multiple wavelengths (i.e., optical carriers) of light on port K of optical link 105-2 in an upstream direction. In one embodiment, the multiplexer filter resource 130-2 receives optical carriers 19, 20, 23, and 25 on respective ports Z, Y, X, and W of multiplexer filter resource 130-2. Multiplexer filter resource 130-2 outputs optical carriers in channels 19, 20, 23, and 25 out of bi-directional port M over a communication link such as a fiber optic link to bi-directional port S of block filter 120-2. Block filter 120-2 redirects the received optical carriers in channels 19, 20, 23, and 25 out of port Q of block filter 120-2 upstream onto fiber optic link 105 towards block filter 120-1. Block filter 120-2 and multiplexer filter resource 130-2 can be co-located or located at disparate locations with respect to each other.

The block filter 120-1 redirects wavelengths or optical carriers in channels 19, 20, 23, and 25 that fall within a predetermined wavelength range off of the optical link 105-1 and out of bi-directional optical port L over a communication link such as a fiber optic link to bi-directional port M of multiplexer filter resource 130-1. Block filter 120-1 and multiplexer filter resource 130-1 can be co-located or located at disparate locations with respect to each other.

In turn, multiplexer filter resource 130-1 redirects the received optical carriers in channels 19, 20, 23, and 25 out of respective ports W, X, Y, and Z as shown.

In a reverse direction, the multiplexer filter resource 130-1 includes multiple optical input ports A, B, C, and D to receive respective optical carriers in channels 21, 22, 24, and 26 as shown. The multiplexer filter resource 130-1 optically aggregates and directs the collection of optical carriers in channels 21, 22, 24, and 26 out of bi-directional port M of multiplexer filter resource 130-1 over a communication link such as a fiber optic link and into port L of block filter 120-1.

Block filter 120-1 optically redirects the optical carriers out of port K of the block filter 120-1 upstream on optical link 105-2 to block filter 120-2.

The block filter 120-2 optically redirects the received wavelengths or optical carriers in channels 21, 22, 24, and 26 from port Q off of the optical link 105-2 and out of bidirectional optical port S over a communication link such as a fiber optic link to bi-directional port M of multiplexer filter resource 130-2.

In turn, multiplexer filter resource 130-2 redirects the received optical carriers 21, 22, 24, and 26 out of respective ports D, C, B, and A as shown.

Thus, each of the first block filter 120-1 and the second block filter 120-2 can be a bi-directional filter device that redirects optical carriers within the particular block wavelength range onto or off of the fiber optic link depending on a direction of the optical signal.

Note that optical carriers that do not fall within a bandpass range (e.g., a range of wavelengths including optical channels 19-26) assigned to block filters 120 are not redirected off of the optical link 105-2 to optical multiplexer resources 130, but are instead transmitted further upstream or downstream.

For example, assume that block filter 120-2 receives a first group of one or more out-of-band optical carriers (e.g., any of one or more carriers outside the range of optical carriers 19-26) on port R as transmitted in an upstream direction from optical link 105-3. Block filter 120-2 passes the received first group of out-of-band carriers out of port Q upstream on optical link 105-2. Port K of block filter 120-1 receives the first group of out-of-band optical carriers from optical link 105-2 and, since the received first group of out-of-band optical carriers falls outside the range of wavelengths (e.g., optical channels 19-26) that are redirected to port L, passes the received first group of out-of-band carriers out of port J upstream on optical link 105-1.

Assume as another example that block filter 120-1 receives a second group of one or more out-of-band optical carriers (e.g., any of one or more carriers outside the range of optical channels 19-26) on port J as transmitted in a downstream direction on optical link 105-1. Block filter 120-1 passes the received second group of out-of-band carriers out of port K downstream on optical link 105-2. Port Q of block filter 120-2 receives the second group of out-of-band optical carriers from optical link 105-2 and, since the received second group of out-of-band optical carriers falls outside the range of wavelengths that are redirected to port S, passes the received second group of out-of-band carriers out of port R downstream on optical link 105-3.

Figure 2:
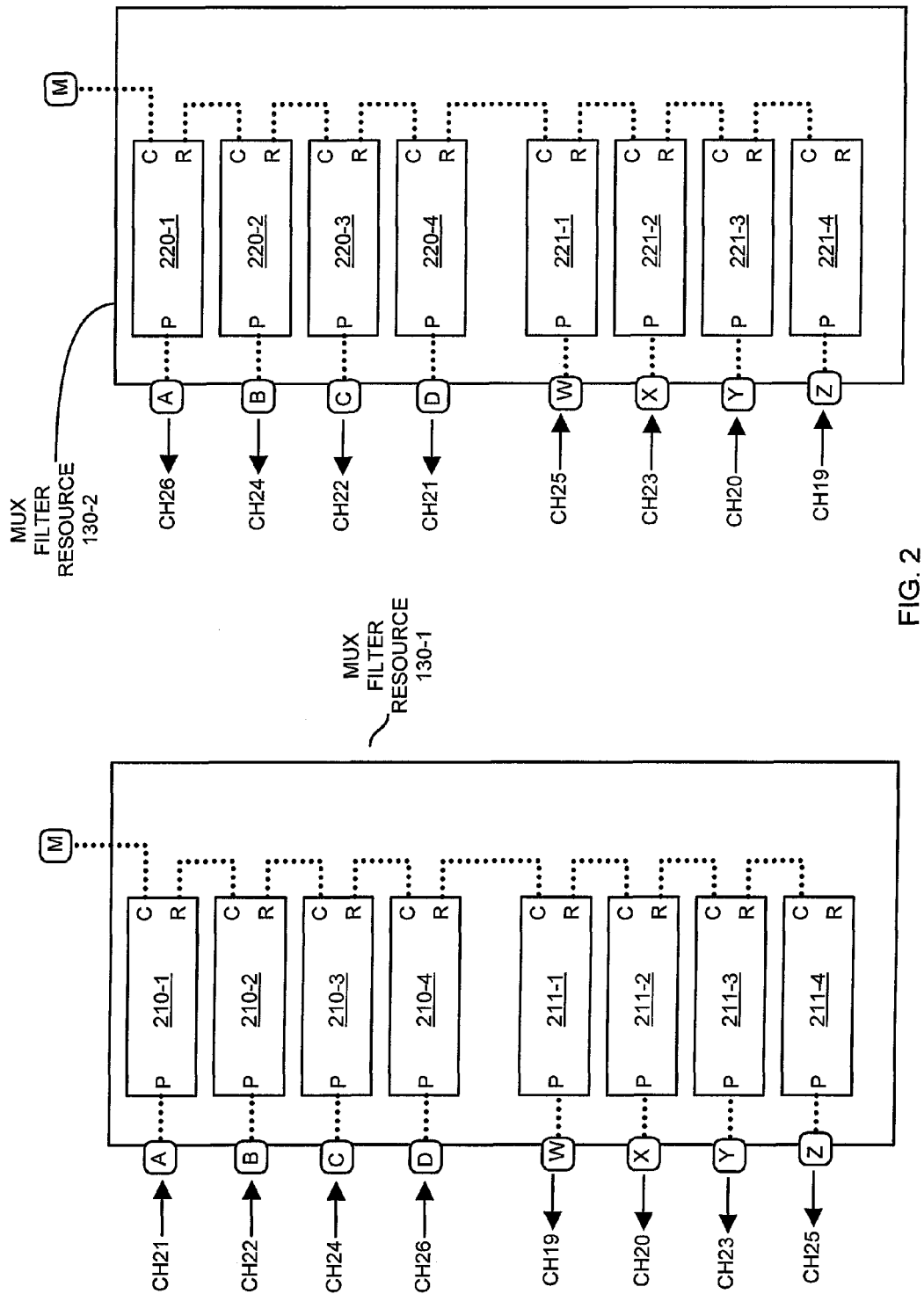
FIG. 2 is an example diagram illustrating a configuration of multiplexer filter resources according to embodiments herein.

FIG. 2 is an example diagram more particularly illustrating multiplexer filter resources and respective functionality according to embodiments herein.

As shown in this example embodiment, multiplexer filter resource 130-1 includes a series connection of multiple optical filter resources including optical filter resource 210-1, optical filter resource 210-2, optical filter resource 210-3, and optical filter resource 210-4 (collectively, optical filter resources 210). As shown, the series connection in multiplexer filter resource 130-1 further includes optical filter resource 211-1, optical filter resource 211-2, optical filter resource 211-3, and optical filter resource 211-4 (collectively, optical filter resources 211).

In this example embodiment, each of the optical filter resources includes a pass port (P), a common port (C), and a reflection port (R). During operation, the common port of each filter passes all wavelengths to a next filter resource or port in the sequence. The pass port passes an assigned band of one or more wavelengths. The reflection port stops pass port wavelengths but passes all others out to a next optical filter resource or port in the sequence. Dotted lines between optical ports and optical filter resources 210 represent fiber optical links.

In one embodiment, the ordering of optical filter resources in each of the multiplexer filter resources 130 can vary to balance losses. For example, optical losses occur in each optical filter resource. To reduce losses in the downstream direction, optical filter resources 210 and 220 are disposed nearest to respective bi-directional port M. To balance losses amongst the optical channels, as shown, the ordering of the optical channels is reversed. That is, as shown, the ordering of optical filter resources in multiplexer filter resource 130-1 is channel 21, 22, 24, and 26 in the sequence of optical filters. The ordering in complementary multiplexer filter resource 130-2 is optical channel 26, 24, 22, and 21.

Downstream loss can be traded against upstream loss. That is, upstream optical filter resources 211 and 221 reside farthest from the port M. Thus, upstream optical channels 19, 20, 23, and 25 experience losses from sequence of respective optical filter resources 210 and 220. Downstream optical channels 21, 22, 24, and 26 do not experience losses from passing through sequence of respective optical filter resources 211 and 221. This is advantageous, as it can be used to better match the asymmetrical nature of real-world data traffic. Since the upstream links often carry less traffic, they can better tolerate higher losses for a given set of implementation trade-offs compared to the more heavily loaded downstream links.

Operation of Multiplexer Filter Resource 130-1

In this example embodiment, assume that bi-directional port M of multiplexer filter resource 130-1 receives, as input, a set of optical carriers in channels 19, 20, 23, and 25 from block filter 120-1. Recall that block filter 120-1 redirects the optical carriers in channels 19, 20, 23, and 25 in the upstream direction off of optical link 105-2 to port M of multiplexer filter resource 130-1 because they (i.e., optical channels 19, 20, 23, and 25) fall within the optical bandpass range assigned to block filter 120-1.

In such an instance, port C of optical filter resource 210-1 receives the set of optical carriers in channels 19, 20, 23, and 25. Port R of optical filter resource 210-1 outputs all received optical carriers in channels 19, 20, 23, and 25 because optical filter resource 210-1 is configured to pass only assigned optical carrier in channel 21 out of port P to optical port A.

Port C of optical filter resource 210-2 receives the set of optical carriers in channels 19, 20, 23, and 25. Port R of optical filter resource 210-2 outputs the set of carriers in channels 19, 20, 23, and 25 to optical filter resource 210-3 because optical filter resource 210-2 is configured to pass only assigned optical carrier in channel 22 out of port P to optical port B.

Port C of optical filter resource 210-3 receives the set of optical carriers in channel 19, 20, 23, and 25. Port R of optical filter resource 210-3 outputs the set of carriers in channels 19, 20, 23, and 25 to optical filter resource 210-4 because optical filter resource 210-3 is configured to pass only a carrier in assigned optical channel 24 out of port P to optical port C.

Port C of optical filter resource 210-4 receives the first set of optical carriers in channels 19, 20, 23, and 25. Port R of optical filter resource 210-4 outputs the set of carriers in channels 19, 20, 23, and 25 to optical filter resource 211-1 because optical filter resource 210-4 is configured to pass only assigned optical carrier in channel 26 out of pass port P to optical port D.

Port C of optical filter resource 211-1 receives the set of optical carriers in channels 19, 20, 23, and 25. Port P of optical filter resource 211-1 passes the optical carrier in channel 19 to optical output port W. Port R of optical filter resource 211-1 redirects all other carriers in channels 20, 23, and 25 to optical filter resource 211-2.

Port C of optical filter resource 211-2 receives carriers in channels 20, 23, and 25. Port P of optical filter resource 211-2 passes carrier in channel 20 to optical output port X. Port R of optical filter resource 211-2 redirects all other received carriers in channels 23 and 25 to optical filter resource 211-3.

Port C of optical filter resource 211-3 receives carriers in channels 23 and 25. Port P of optical filter resource 211-3 outputs carrier in channel 23 to optical output port Y. Port R of optical filter resource 211-3 outputs received carrier in channel 25 to optical filter resource 211-4.

Port C of optical filter resource 211-4 receives carrier in channel 25. Port P of optical filter resource 211-4 outputs carrier in channel 25 to optical output port Z.

In a reverse direction, the series connection of multiple optical filter resources 210 aggregates optical carriers in channels 21, 22, 24, and 26 and outputs them to optical output port M of multiplexer filter resource 130-1.

For example, port P of optical filter resource 210-4 receives optical carrier in channel 26 from optical input port D. Optical filter resource 210-4 passes the received optical carrier in channel 26 out of its port C (common) to port R (reflected) of optical filter resource 210-3. As discussed herein, port C in the following non-limiting examples refers to a respective "common" port of a filter resource; port R in the following non-limiting examples refers to a respective "reflected" port of a filter resource.

By way of a non-limiting example, the optical filter resources can refer to the use of thin-film filter technology, where a "Common" wide spectrum connection is separated into two ports: 1) the block passband, and 2) all other spectrum regions in the device operating range.

Other filter technologies such as diffraction gratings may also be useable in this invention to produce optical filters. In this latter case, those would not have a port named "reflected" because they may not be based on reflection.

Port R of optical filter resource 210-3 receives optical carrier in channel 26 from optical filter resource 210-4. Port P of optical filter resource 210-3 receives optical carrier in channel 24 from optical input port C. Optical filter resource 210-3 aggregates and then passes optical carriers in channels 26 and 24 out of port C of optical filter resource 210-3 to port R of optical filter resource 210-2.

Port R of optical filter resource 210-2 receives optical carrier in channels 26 and 24 from optical filter resource 210-3. Port P of optical filter resource 210-2 receives optical carrier in channel 22 from optical input port B. Optical filter resource 210-2 aggregates and then passes optical carriers in channels 26, 24, and 22 out of port C of optical filter resource 210-2 to port R of optical filter resource 210-1.

Port R of optical filter resource 210-1 receives optical carriers in channels 26, 24, and 22 from optical filter resource 210-2. Port P of optical filter resource 210-1 receives optical carrier in channel 21 from optical input port A. Optical filter resource 210-1 aggregates and passes optical carriers in channels 26, 24, 22, and 21 out of port C of optical filter resource 210-1 to bi-directional port M of multiplexer filter resource 130-1.

Operation of Multiplexer Filter Resource 130-2

The multiplexer filter resource 130-2 operates in a similar manner.

In this example embodiment, assume that port M of multiplexer filter resource 130-2 receives, as input, a set of optical carriers in channels 21, 22, 24, and 26 from block filter 120-2. Recall that block filter 120-2 redirects the optical carriers in channels 21, 22, 24, and 26 in the downstream direction off of optical link 105-2 to port M of multiplexer filter resource 130-2 because they (i.e., optical channels 21, 22, 24, and 26) fall within the optical bandpass range assigned to block filter 120-2.

Port C of optical filter resource 220-1 receives the set of optical carriers in channels 21, 22, 24, and 26 from bi-directional port M. Optical filter resource 220-2 is configured to pass only assigned optical carrier in channel 26 out of port P to optical port A of multiplexer filter resource 130-2 (which happens to be assigned as an output optical port in this case). Port R of optical filter resource 220-1 outputs the balance of carriers in channels 21, 22, and 24 to port C of optical filter resource 220-2.

Port C of optical filter resource 220-2 receives the set of optical carriers in channels 21, 22, and 24 from optical filter resource 220-1. Optical filter resource 220-2 is configured to pass only assigned optical carrier in channel 24 out of its respective port P to port B of multiplexer filter resource 130-2 (which happens to be assigned as an output in this case). Port R of optical filter resource 220-2 outputs the set of carriers in channels 21 and 22 to port C of optical filter resource 220-3.

Port C of optical filter resource 220-3 receives the set of optical carriers in channels 21 and 22. Optical filter resource 220-2 is configured to pass only assigned optical carrier in channel 22 out of its respective port P to port C of multiplexer filter resource 130-22 (which happens to be assigned as an output in this case). Port R of optical filter resource 220-3 outputs the carrier in channel 21 to port C of optical filter resource 220-4.

Port C of optical filter resource 220-4 receives optical carrier in channel 21. Optical filter resource 220-4 is configured to pass only assigned optical carrier in channel 21 out of its respective port P to port D of multiplexer filter resource 130-2 (which happens to be assigned as an output in this case). Because there are no more downstream channels left, port R of optical filter resource 220-4 does not output any optical carriers to port C of optical filter resource 221-1.

In a reverse direction, the sequence of optical filter resources 221 aggregates and transmits upstream optical carriers in channels 19, 20, 23, and 25 to sequence of optical filter resources 220. Optical filter resources 220 convey the optical carriers to bi-directional port M of the multiplexer filter resource 130-2.

More specifically, port Z of optical filter resource 221-4 is an optical input port that receives optical carrier in channel 19. Port C of optical filter resource 221-4 outputs the received optical carrier in channel 19 to port R of optical filter resource 221-3.

Port R of optical filter resource 221-3 receives optical carrier in channel 19 from optical filter resource 221-4. Port P of optical filter resource 221-3 receives optical carrier in channel 20 from port Y of multiplexer filter resource 130-2. Optical filter resource 221-3 combines and outputs optical carriers in channels 19 and 20 to port R of optical filter resource 221-2.

Port R of optical filter resource 221-2 receives optical carriers in channels 19 and 20 from optical filter resource 221-3. Port P of optical filter resource 221-2 receives optical carrier in channel 23 from port X of multiplexer filter resource 130-2. Optical filter resource 221-2 aggregates and outputs a combination of optical carriers in channels 19, 20, and 23 to port R of optical filter resource 221-1.

Port R of optical filter resource 221-1 receives optical carriers in channels 19, 20 and 23 from optical filter resource 221-2. Port P of optical filter resource 221-1 receives optical carrier in channel 25 from port W of multiplexer filter resource 130-2. Optical filter resource 221-1 aggregates and outputs a combination of optical carriers in channels 19, 20, 23 and 25 to port R of optical filter resource 220-4.

The series connection of multiple optical filter resources 220 then conveys the combination of optical carriers in channels 21, 22, 24, and 26 to and out of port M of the multiplexer filter resource 130-2. For example, port R of optical filter resource 220-4 receives the optical carriers in channels 19, 20, 23, and 25 from optical filter resource 221-1. Optical filter resource 220-4 outputs the combination of optical carriers in channels 19, 20, 23, and 25 out of port C of optical filter resource 220-4 to optical filter resource 220-3.

Port R of optical filter resource 220-3 receives the optical carriers in channels 19, 20, 23, and 25 from port C of optical filter resource 220-4. Optical filter resource 220-3 outputs the combination of optical carriers in channels 19, 20, 23, and 25 out of port C of optical filter resource 220-3 to optical filter resource 220-2.

Port R of optical filter resource 220-2 receives the optical carriers in channels 19, 20, 23, and 25 from port C of optical filter resource 220-3. Optical filter resource 220-2 outputs the combination of optical carriers in channels 19, 20, 23, and 25 out of port C of optical filter resource 220-2 to optical filter resource 220-1.

Port R of optical filter resource 220-1 receives the optical carriers in channels 19, 20, 23, and 25 from port C of optical filter resource 220-2. Optical filter resource 220-1 outputs the combination of optical carriers in channels 19, 20, 23, and 25 out of port C of optical filter resource 220-1 to bi-directional port M of the multiplexer filter resource 130-2. As previously discussed, block filter 120-2 receives the combination of optical carriers in channels 19, 20, 23, and 25 from the bi-directional port M.

Figure 3:
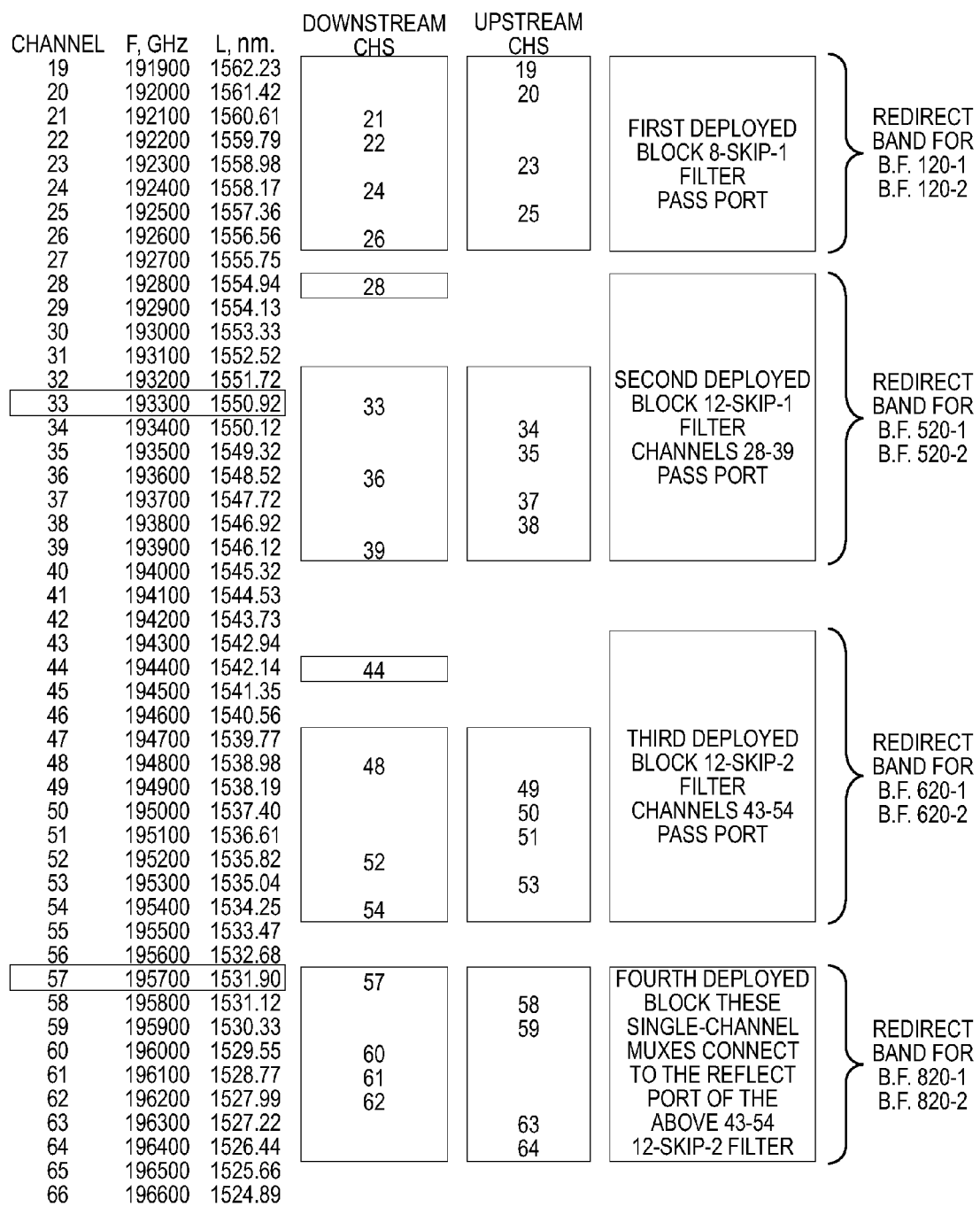
FIG. 3 is a diagram illustrating an example of assigned optical channel usage in a fiber network according to embodiments herein.

FIG. 3 is a diagram illustrating an example of assigned optical channel usage in a fiber network according to embodiments herein. In accordance with settings in FIG. 3, FIGS. 5-9 illustrate expansion of the cable network environment to include multiple pairings of block filters.

Embodiments herein can be implemented in a shared cable network environment in which the block filter and multiplexer filter resources are used to distribute content to one or more different services groups using a common fiber optic link. That is, an optical link 105 can be configured to include multiple block filter pairs. As discussed, each block filter pair enables shared use of an optical link 105.

As shown in FIG. 3, the settings of respective block filter pairs can be spaced apart from each other. For example, the block filter pair including block filter 120-1 and block filter 120-2 support redirecting optical signals (such as carriers) in channels 19-26. Optical channel 27 is unused and provides a spacing with respect to the next block filter pair including block filter 520-1 and block filter 520-2. Optical channels 40-42 are unused and provide spacing with respect to the next block filter pair including block filter 620-1 and block filter 620-2. Optical channels 55 and 56 are unused and provide a spacing with respect to the next block filter pair including block filter 820-1 and block filter 820-2.

Further as shown, each optical channel can be assigned as an upstream channel or a downstream channel on the optical link 105. In one embodiment, one or more of the upstream and downstream assigned optical channels are interleaved with respect to each other. For example, optical channel 23 can be allocated as an upstream optical channel interleaved between downstream optical channels 22 and 23. Optical channel 24 can be allocated as a downstream optical channel interleaved between upstream optical channels 23 and 25, and so on.

In one non-limiting example embodiment, use of the optical channels is deployed from longer wavelengths to shorter wavelengths. For example, the first pair of block filters installed in network 100 can be configured to support passing optical signals (i.e., carriers) in channels 19-26; the second pair of block filters installed in network 100 can be configured to support passing optical signals in channels 28-39; and so on. The following figures illustrate a more specific implementation of network 100 in accordance with allocation as specified by FIG. 3.

Figure 4:
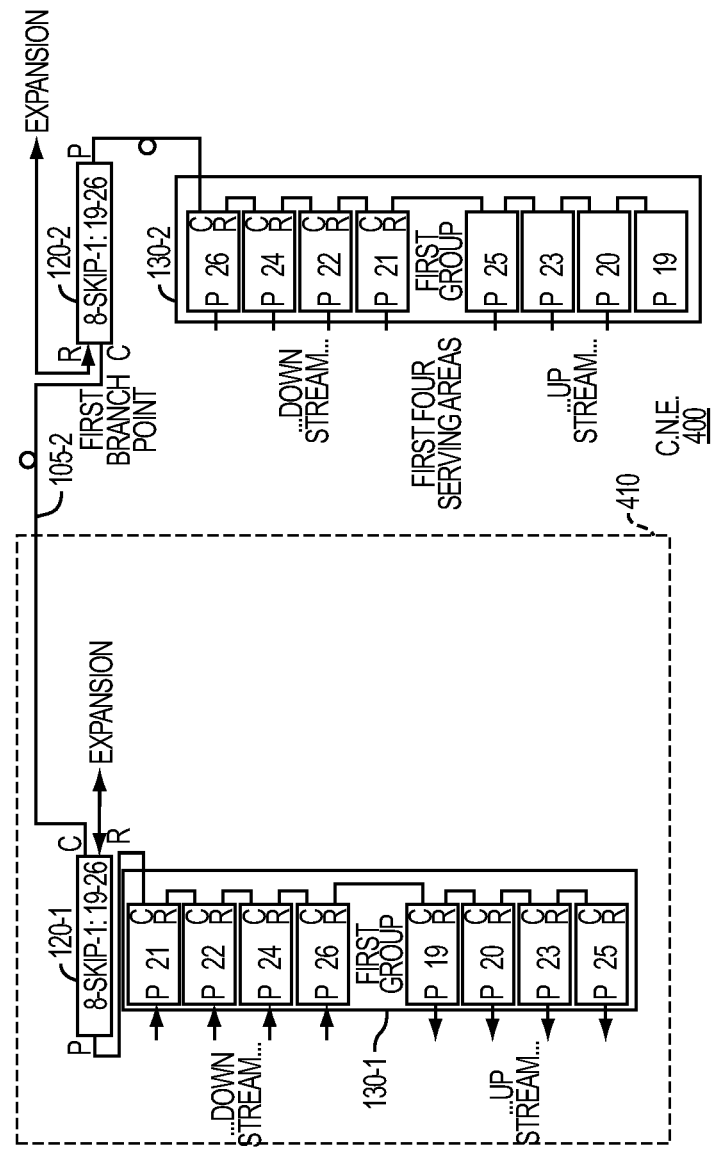
FIG. 4 is an example diagram illustrating initial installation of an optical network to include a single block filter according to embodiments herein.

FIG. 4 is an example diagram illustrating initial installation of an optical network to include a single block filter according to embodiments herein.

As shown, block filter pair and corresponding multiplexer filter resources can be installed in cable network environment 400 to support upstream and downstream optical channels. As previously discussed, the block filter 120-1 can be disposed at one end of optical link 105-1; block filter 120-2 can be disposed at the other end of the optical link 105-2.

Further as shown, block filter 120-1 can be disposed in a hub resource 410 of a cable network environment 400. Optical channels 19-26 support bi-directional communication from the hub resource 410 to a first service area in cable network environment including one or more service areas. (Note that additional details of cable network environment 400 are shown and discussed with respect to FIG. 12.)

Figure 12:
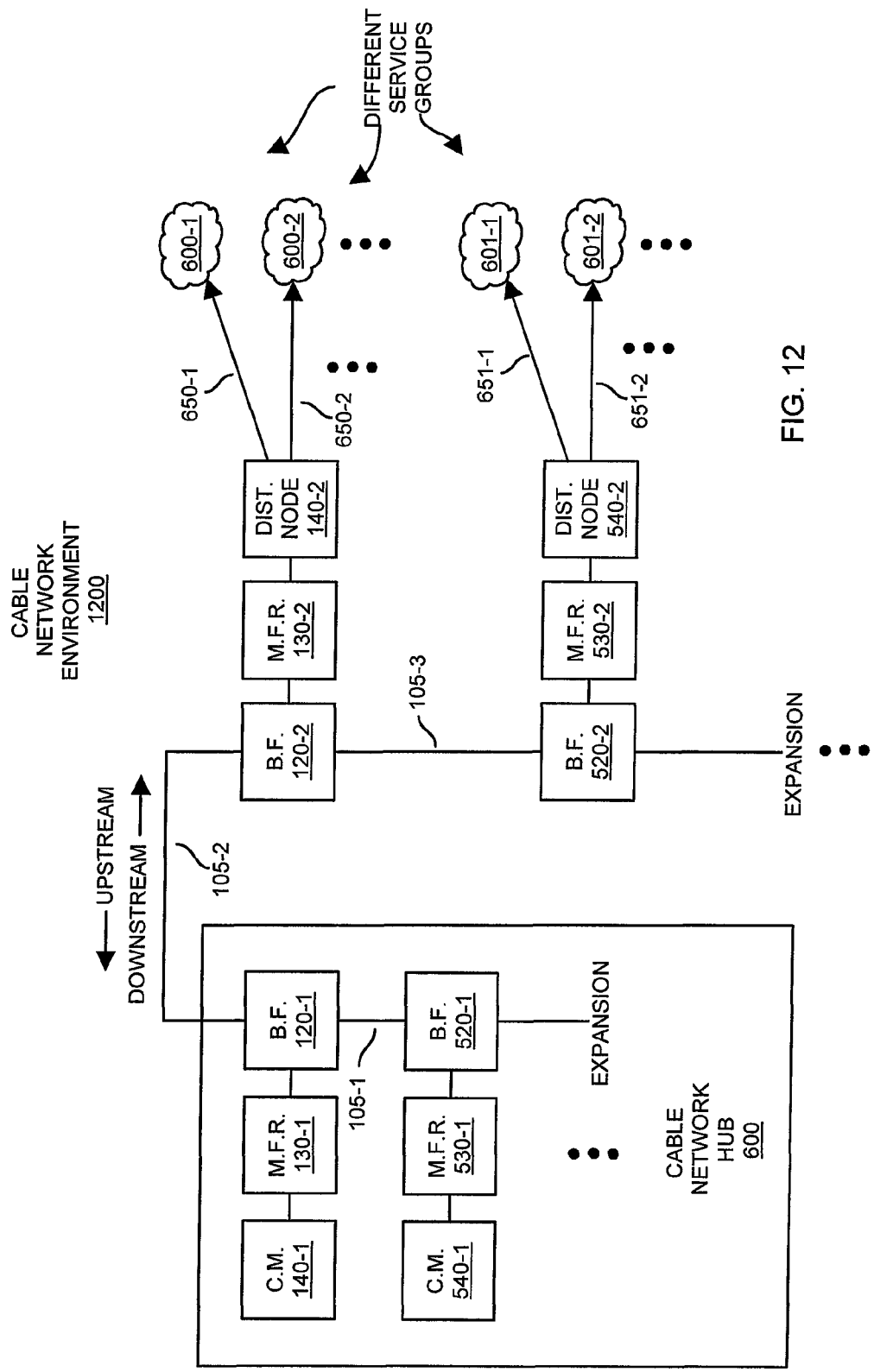
FIG. 12 is an example diagram illustrating use of block filter pairs and related resources according to embodiments herein.

In one embodiment, a pair of upstream and downstream optical channels can be assigned for servicing a respective service area. For example, optical channels 25 and 26 can be assigned to receive and distribute data to a first service area; optical channels 23 and 24 can be assigned to receive and distribute data to a second service area; optical channels 20 and 22 can be assigned to receive and distribute data to a third service area; and so on. As mentioned, additional details are shown in FIG. 12.

FIGS. 5-9 are example diagrams illustrating expansion of an optical network to include multiple block filter pairs according to embodiments herein.

Figure 5:
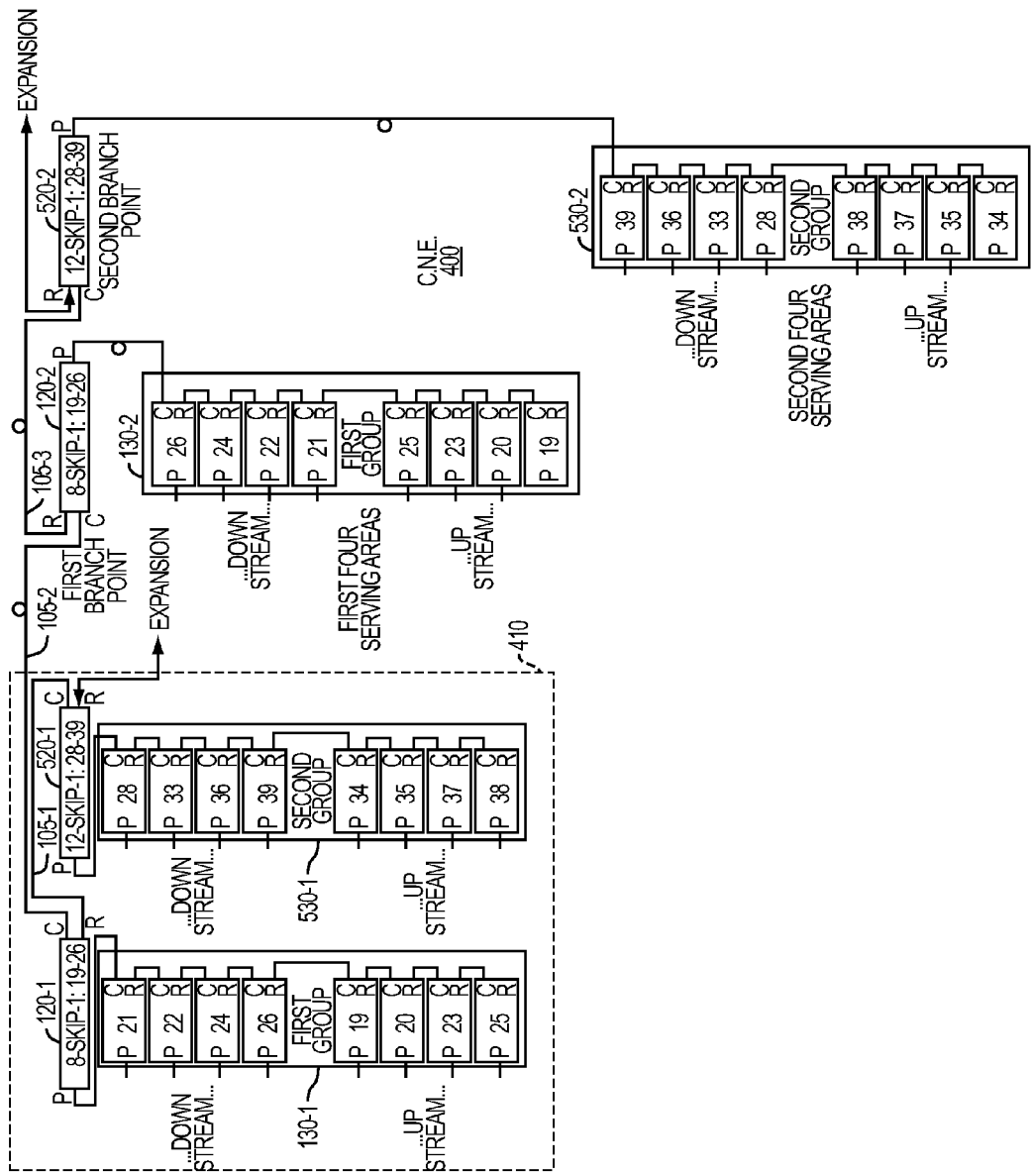
FIGS. 5-9 are example diagrams illustrating expansion of an optical network to include multiple block filter pairs according to embodiments herein.

In accordance with example settings as discussed in FIG. 3, FIG. 5 is a diagram illustrating expansion of the cable network environment 400 to include an additional block filter pair including block filter 520-1 disposed in hub resource 410 and block filter 520-2 disposed downstream on optical link 105. Note that the additional block filter pair can be added to network 400 without interrupting data transmission service with respect to block filter 120-1 and block filter 120-2.

Block filter 120-1 and block filter 120-2 pass all carriers (upstream or downstream, as the case may be) along optical link 105 other than optical signals in channels 19-26, which are in the redirection band.

The block filters 520 and multiplexer filter resources 530 operate in a similar manner as block filters 120 and multiplexer filter resources 130; however, as shown in FIG. 3 settings, the block filters 520 and multiplexer filter resources 530 support a different optical redirection band (e.g., optical channels 28-39) and processing.

For example, as shown in FIG. 5, multiplexer filter resource 530-2 includes a series connection of optical filter resources to aggregate optical signals (i.e., modulated carrier signals) in channels 34, 35, 37, and 38. Multiplexer filter resource 530-2 outputs the aggregated set of optical signals to the block filter 520-2. In an upstream direction, block filter 520-2 redirects optical signals in channels 34, 35, 37, and 38 received from multiplexer filter resource 530-2 upstream on optical link 105 towards block filter 520-1.

Upstream, block filter 120-1 passes received optical carriers in optical channels 34, 35, 37, and 38 upstream to block filter 520-1. Block filter 520-1 redirects optical carriers in channels 34, 35, 37, and 38 off of the optical link 105 to multiplexer filter resource 530-1. In a similar manner as previously discussed, multiplexer filter resource 530-1 includes a series connection of optical filter resources to redirect optical carriers in channels 34, 35, 37, and 38 to respective optical output ports.

Multiplexer filter resource 530-1 includes a series connection of optical filter resources to aggregate inputted optical signals in channels 28, 33, 36, and 39. Multiplexer filter resource 530-1 outputs the aggregated set of optical carriers to the block filter 520-1. Block filter 520-1 redirects optical signals in channels 28, 33, 36, and 39 received from multiplexer filter resource 530-1 downstream on optical link 105 towards block filter 520-2.

Downstream, block filter 520-2 redirects optical signals in channels 28, 33, 36, and 39 off of the optical link 105 to multiplexer filter resource 530-2. Multiplexer filter resource 530-2 includes a series connection of optical filter resources to separate and redirect signals in optical channels 28, 33, 36, and 39 to respective optical output ports of the multiplexer filter resource 530-2.

Figure 6:
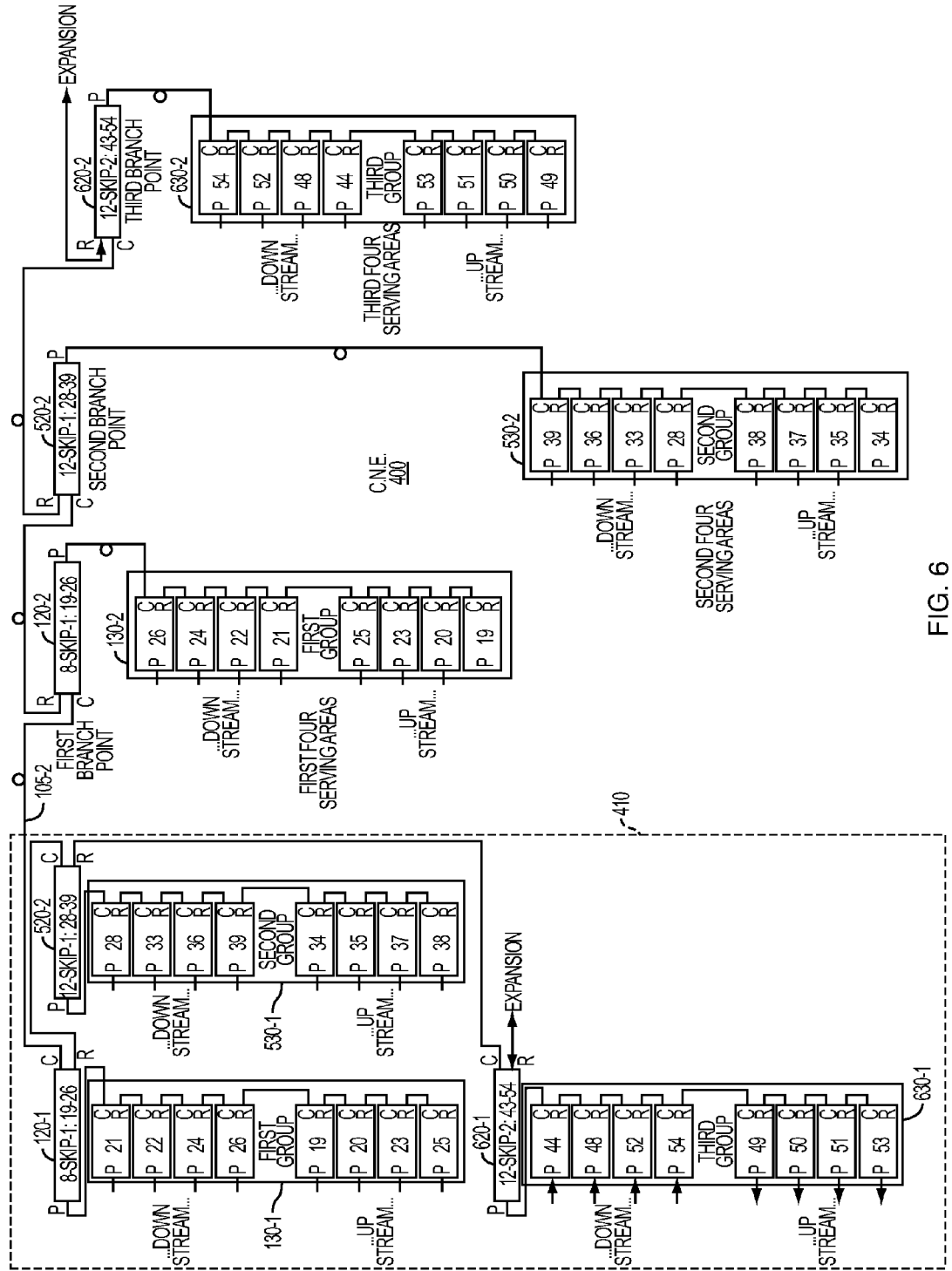

FIG. 6 is an example diagram illustrating a cable network environment according to embodiments herein.

In accordance with example settings as discussed in FIG. 3, FIG. 6 is a diagram illustrating expansion of the cable network environment 400 to include block filter pair including block filter 620-1 disposed in hub resource 410 and block filter 620-2 disposed downstream on optical link. Block filter 620-1, block filter 620-2, and related optical hardware resources can be installed without interrupting services associated with block filter 120-1, block filter 120-2, block filter 520-1, and block filter 520-2.

In this example embodiment, the block filters 620 and multiplexer filter resources 630 operate in a similar manner as block filters 120 and multiplexer filter resources 130; however, as shown in FIG. 3 settings, the block filters 620 and multiplexer filter resources 630 support redirection of a different optical. For example, as shown in FIG. 3, block filters 620 are assigned to a redirection band of signals on channels 43-54.

During operation, in an upstream direction, block filter 620-1 redirects optical signals in channels 49, 50, 51, and 53 off of the optical link 105 to multiplexer filter resource 630-1. Multiplexer filter resource 630-1 includes a series connection of optical filter resources to redirect optical signals in channels 49, 50, 51, and 53 out of respective optical output ports.

Multiplexer filter resource 630-1 includes a series connection of optical filter resources to aggregate optical signals in channels 44, 48, 52, and 54. Block filter 620-1 redirects optical signals in channels 44, 48, 52, and 54 received from multiplexer filter resource 630-1 downstream on optical link 105 towards block filter 620-2.

Downstream, block filter 620-2 redirects optical signals in channels 44, 48, 52, and 54 off of the optical link 105 to multiplexer filter resource 630-2. Multiplexer filter resource 630-2 includes a series connection of optical filter resources to separate and redirect optical signals in channels 44, 48, 52, and 54 to respective optical output ports.

Multiplexer filter resource 630-2 includes a series connection of optical filter resources to aggregate signals in optical channels 49, 50, 51, and 53. Block filter 620-2 redirects signals in optical channels 49, 50, 51, and 53 received from multiplexer filter resource 630-2 upstream on optical link 105 towards block filter 620-1.

Figure 7:
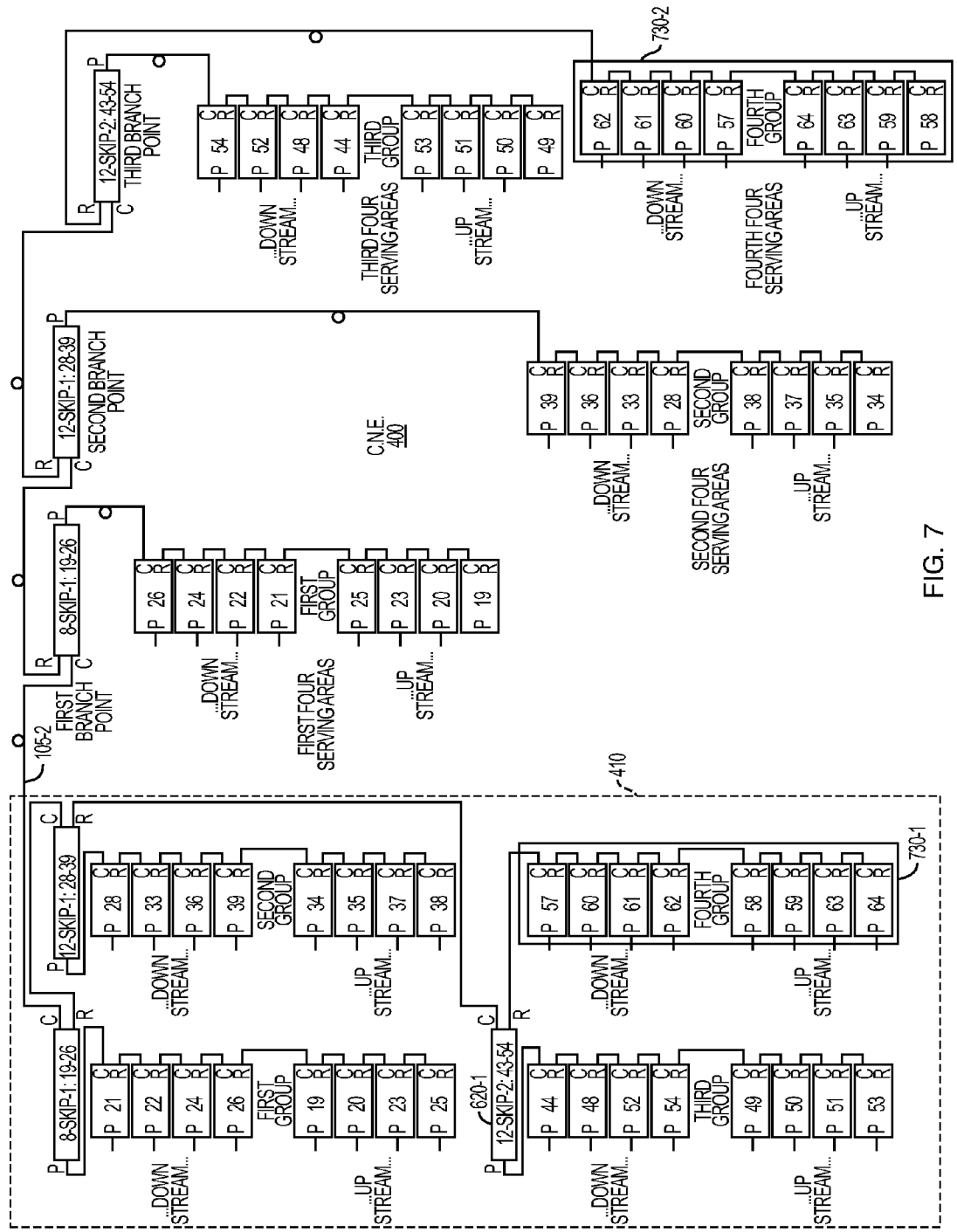

FIG. 7 is an example diagram illustrating expansion of the cable network environment according to embodiments herein. As shown, multiplexer filter resource 730-1 and multiplexer filter resource 730-2 can reside at respective terminal ends of optical link 105. In accordance with such an embodiment, there is no need for a respective block filter pair as the ends are terminated and the cable network environment cannot be expanded.

Figure 8:
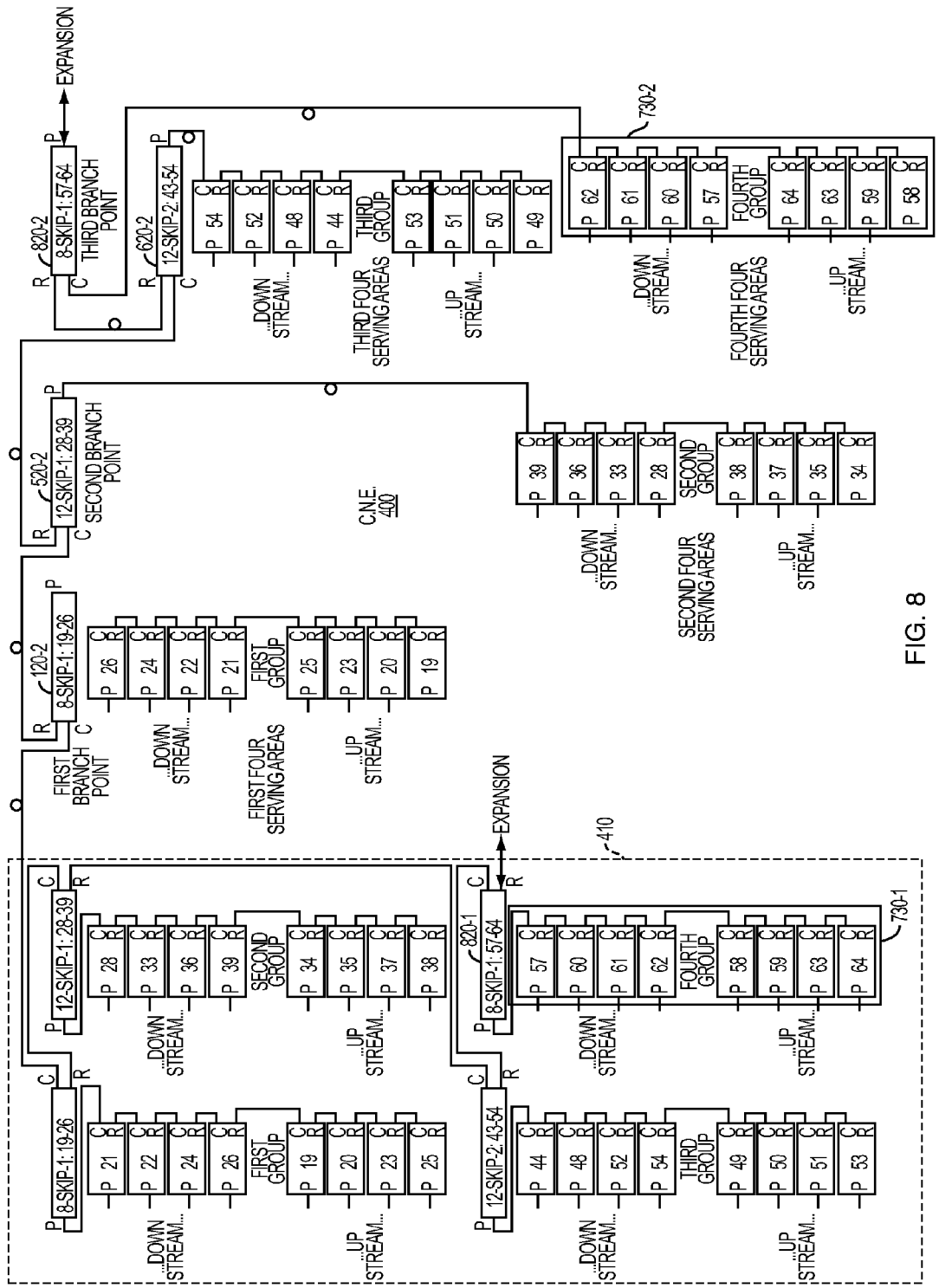

FIG. 8 is an example diagram illustrating expansion of the cable network environment according to embodiments herein. As an alternative to the configuration in FIG. 7, as shown in FIG. 8, the optical link 105 extends beyond block filter pair including block filter 820-1 and block filter 820-2. In such an embodiment, the optical bandwidth on a pre-existing or new optical link can support pass-through transmission (as opposed to redirecting) of optical signals in channels other than channels 19-26, 28-39, 43-54, and 57-64. That is, the cable network environment 400 in FIG. 8 does not include block filters to redirect optical signals in channels 1-18, 27-29, 40-42, 45-46, 55-56, 65, 66, etc., off of the optical link.

Figure 9:
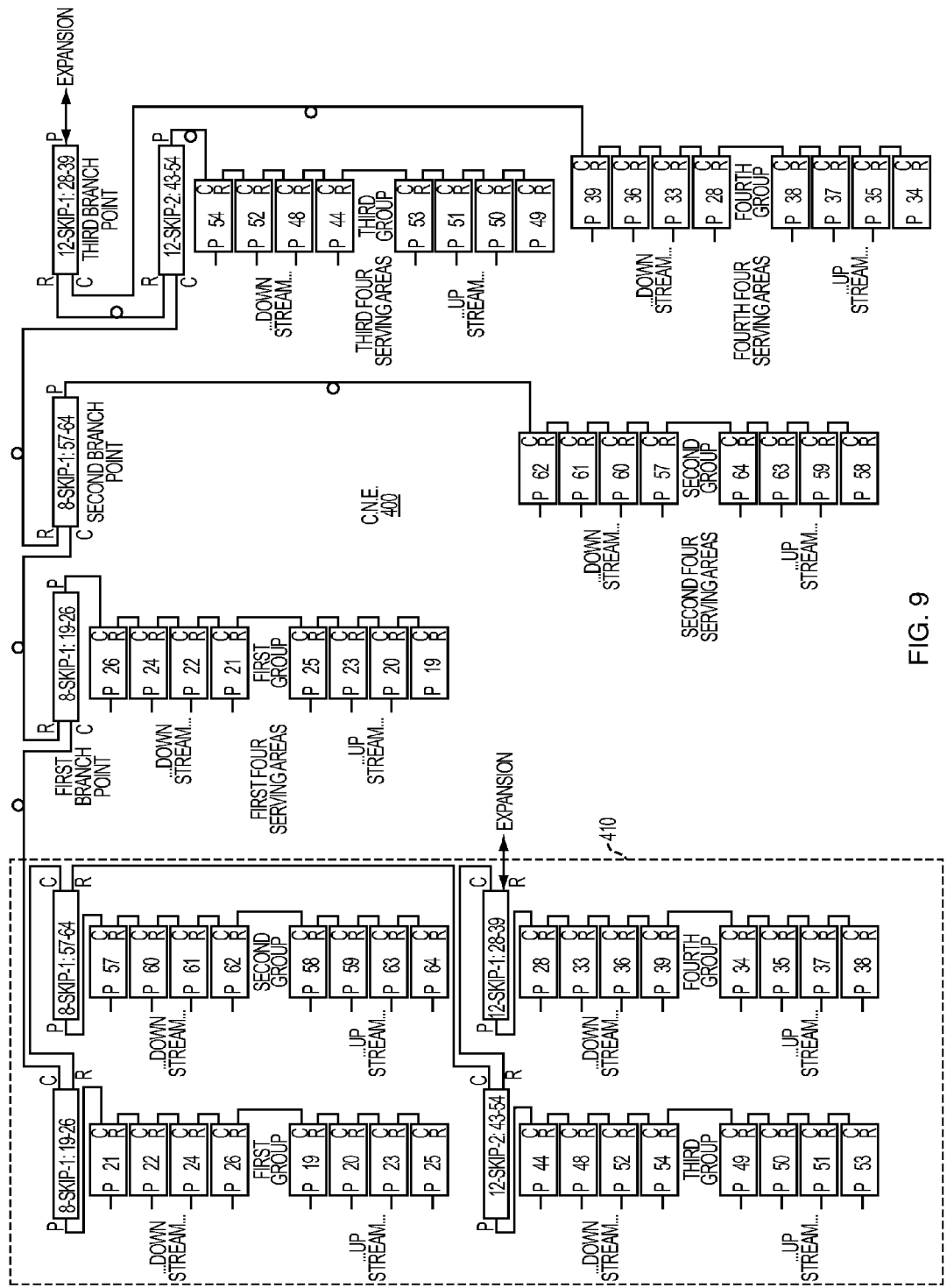

FIG. 9 is an example diagram illustrating expansion of the cable network environment according to embodiments herein. As shown, the block filter pairs in cable network environment 400 can be implemented in any suitable order along the optical link 105.

Figure 10:
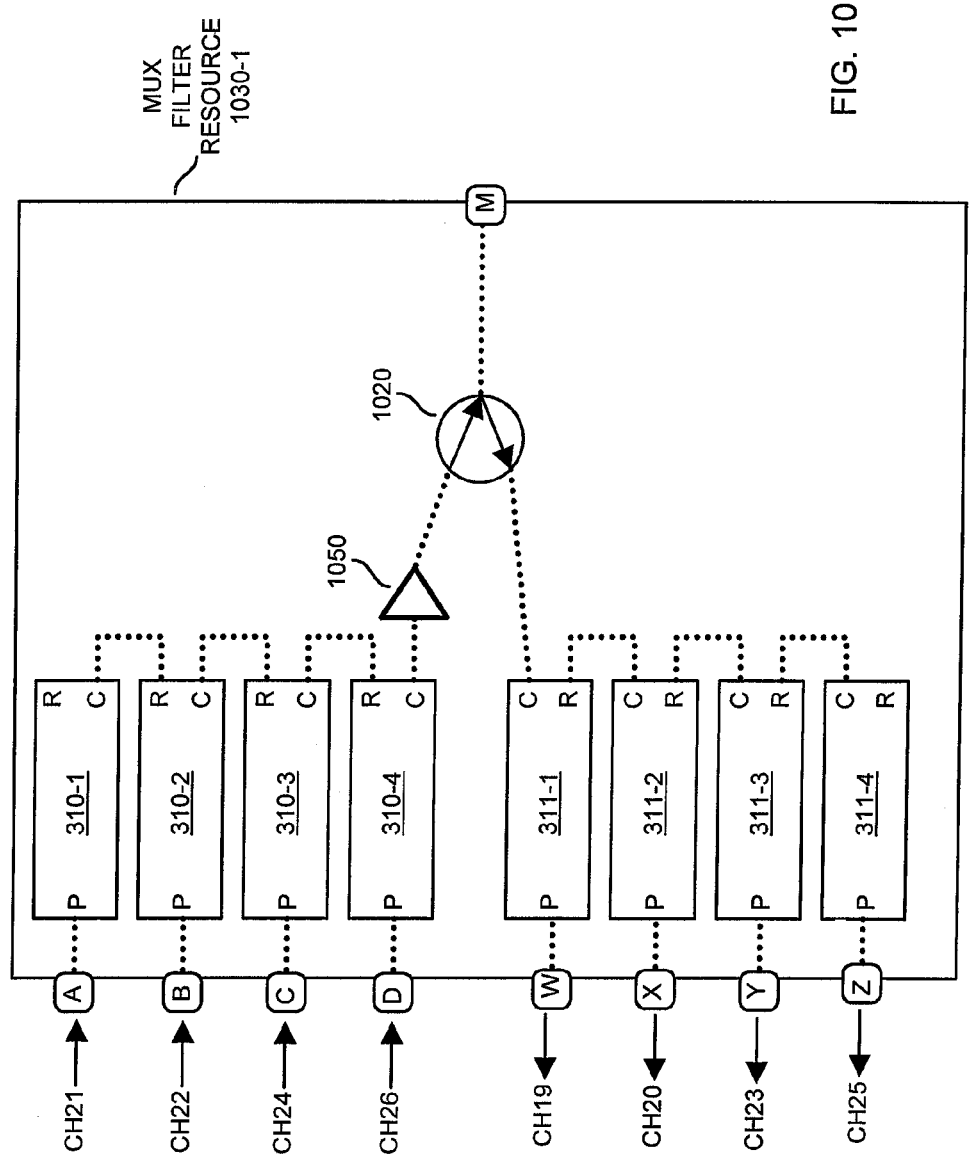
FIG. 10 is an example diagram illustrating a multiplexer filter resource including a circulator resource and/or amplifier according to embodiments herein.

FIG. 10 is an example diagram illustrating a multiplexer filter resource including a circulator resource according to embodiments herein.

As mentioned, each of the multiplexer filter resources can include any suitable series connection of optical filters and corresponding optical ports on which to individually receive and output optical channels.

As shown in FIG. 10, the multiplexer filter resource 1030-1 (e.g., a modified version of multiplexer filter resource 130-1) includes multiple optical input ports such as ports A, B, C, and D on which to individually receive respective optical signals in channels 21, 22, 24, and 26. Multiplexer filter resource 1030-1 further includes multiple optical output ports such as ports W, X, Y, and Z from which to individually output respective optical signals in channels 19, 20, 23, and 25.

Multiplexer filter resource 1030-1 further includes a bi-directional optical port M, circulator resource 1020, and optical amplifier 1050.

The optical filter resources 310 (e.g., optical filter resource 310-1, optical filter resource 310-2, optical filter resource 310-3, etc.) aggregate the optical signals in channels 21, 22, 24, and 26 in a similar manner as previously discussed.

For example, port P of optical filter resource 310-1 receives optical signal in channel 21 from optical input port A. Optical filter resource 310-1 passes optical signal in channel 21 out of port C of optical filter resource 310-1 to port R of optical filter resource 310-2.

Port R of optical filter resource 310-2 receives optical signal in channel 21 from optical filter resource 310-1. Port P of optical filter resource 310-2 receives optical signal in channel 22 from optical input port B. Optical filter resource 310-2 aggregates and then outputs optical signals in channels 21 and 22 out of port C of optical filter resource 310-2 to port R of optical filter resource 310-3.

Port R of optical filter resource 310-3 receives signals in optical channels 21 and 22 from optical filter resource 310-2. Port P of optical filter resource 310-3 receives optical signal in channel 24 from optical input port C. Optical filter resource 310-3 aggregates and then passes optical signals in channels 21, 22, and 24 out of port C of optical filter resource 310-3 to port R of optical filter resource 310-4.

Port R of optical filter resource 310-4 receives optical signals in channels 21, 22, and 24 from optical filter resource 310-3. Port P of optical filter resource 310-4 receives optical signals in channel 26 from optical input port D. Optical filter resource 310-4 aggregates and then passes optical signals in channels 21, 22, 24, and 26 out of port C of optical filter resource 310-4 to the input of optical amplifier 1050.

As its name suggests, the optical amplifier 1050 amplifies one or more of the received optical signals in channels 21, 22, 24, and 26. Circulator resource 1020 receives the amplified optical signals in channels 21, 22, 24, and 26 and redirects the amplified optical signals out of bi-directional port M of multiplexer filter resource 1030-1. Circulator resource 1020 provides isolation of optical filter resources 310 and corresponding optical channels with respect to optical filter resources 311 and corresponding optical channels.

In a reverse direction, the circulator resource 1020 receives a second set of optical signals in channels 19, 20, 23, and 25 as inputs to the bi-directional optical port M from the block filter 120-1. These are inputted optical signals and data from a remote network node.

The multiplexer filter resource 1030-1 directs the second set of optical signals in channels 19, 20, 23, and 25 to respective optical output ports. More specifically, as mentioned, assume that the circulator resource 1020 receives optical signals in channels 19, 20, 23, and 25 from bi-directional port M. Circulator resource 1020 redirects the inputted optical signals in channels 19, 20, 23, and 25 to port C of the optical filter resource 311-1.

The optical filter resource 311-1 is configured to pass optical channel 19 from port P of optical filter resource 311-1 to optical output port W. Optical filter resource 311-1 is further configured to redirect received optical signals in channels 20, 23, and 25 out of port R of the optical filter resource 311-1 to input port C of optical filter resource 311-2.

Port C of optical filter resource 311-2 receives optical signals in channels 20, 23, and 25. The optical filter resource 311-2 is configured to pass optical signal in channel 20 out of port P of optical filter resource 311-2 to optical output port X. Optical filter resource 311-2 is further configured to redirect received optical signals in channels 23 and 25 to input port C of optical filter resource 311-3.

Port C of optical filter resource 311-3 receives optical signals in channels 23 and 25. The optical filter resource 311-3 is configured to pass the signal in optical channel 23 out of port P of optical filter resource 311-3 to optical output port Y. Optical filter resource 311-3 is further configured to redirect received optical signal in channel 25 to input port C of optical filter resource 311-4.

Port C of optical filter resource 311-4 receives an optical signal in channel 25. The optical filter resource 311-4 is configured to pass optical signal in channel 25 out of port P of optical filter resource 311-4 to optical output port Z.

This configuration of the multiplexer filter resource is useful because upstream optical signals in channels 19, 20, 23, and 25 are not needlessly attenuated via passing through optical filter resources 310.

Figure 11:
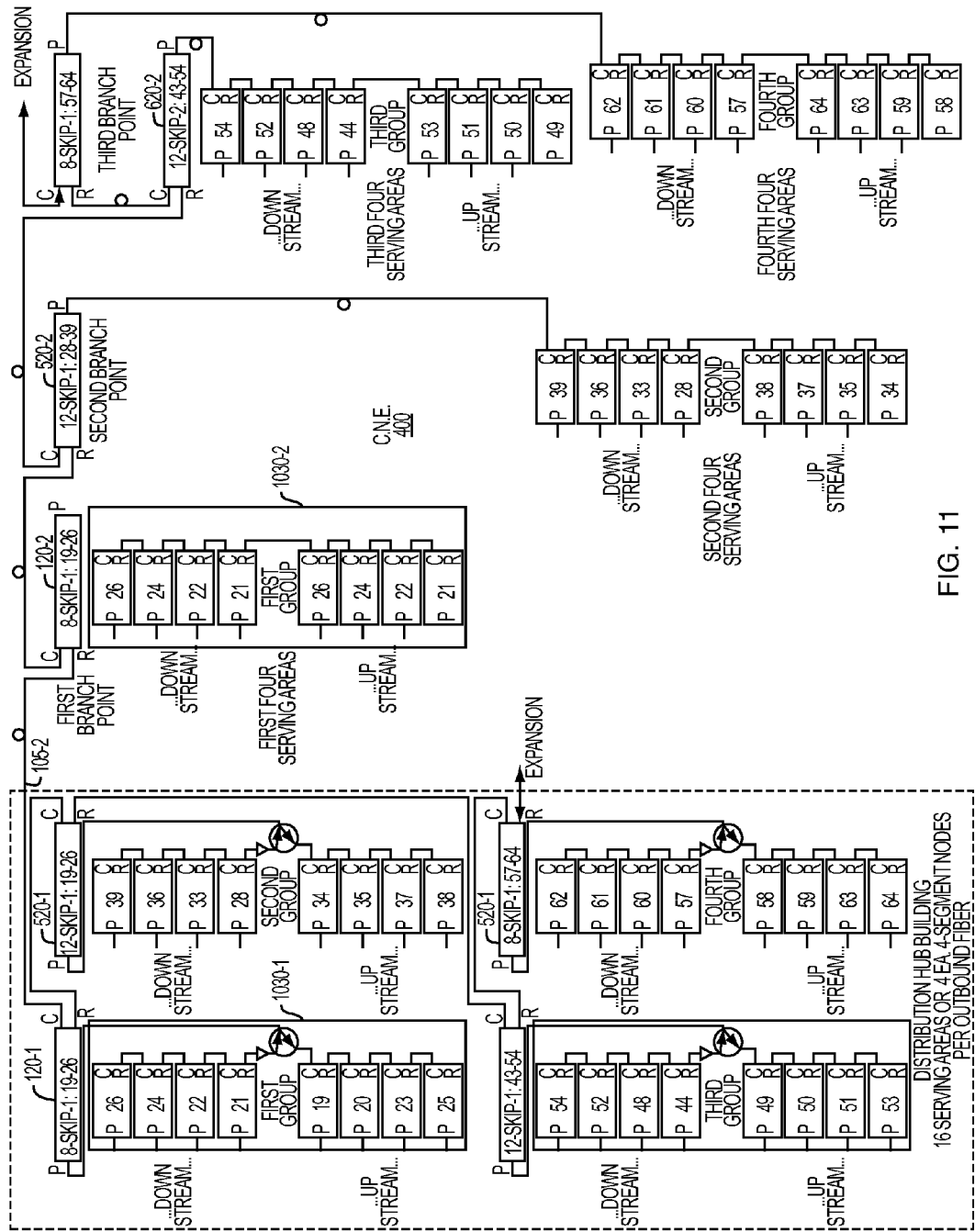
FIG. 11 is an example diagram illustrating an optical network environment including multiple block filters according to embodiments herein.

FIG. 11 is an example diagram illustrating an implementation of a cable network environment according to embodiments herein.

As shown, the cable network environment 1100 can include block filter pairs as well as corresponding multiplexer filter resources. However, the multiplexer filter resource 130-1 has been replaced with multiplexer filter resource 1030-1, which includes the optical amplifier 1050 and circulator resource 1020 as previously discussed. As mentioned, multiplexer filter resource 1030-1 is useful because it amplifies the optical signals prior to transmission to block filter 120-1 and downstream on optical link 105.

As further mentioned, the circulator resource 1020 in multiplexer filter resource 1030-1 provides isolation. Received optical signals on channels 19, 20, 23, and 25 do not need to pass through a series connection of filters including optical filter resources 310 because circulator resource 1020 inputs the signals directly into string of optical filter resources 311. The received optical signals in channels 19, 20, 23, and 25 do not pass through the sequence of optical filter resources 310 and are therefore not attenuated by optical filter resources 311.

FIG. 12 is an example diagram illustrating a cable network environment including block filter pairs and multiplexer filter resources according to embodiments herein.

As shown, cable network environment 1200 includes hub resource 410. Hub resource 410 includes one or more block filters such as block filter 120-1, block filter 520-1, etc. Hub resource 410 can be a building at a headend of a cable network in which the block filters reside.

In this example embodiment, the content manager 140-1 is communicatively coupled to respective ports A, B, C, D, W, X, Y, and Z of multiplexer filter resource 130-1. In a manner as previously discussed, the content manager 140-1 receives data on optical signals in channels 19, 20, 23, and 25 in an upstream direction from distribution node 140-2. Content manager 140-1 transmits data over respective optical signals in channels 21, 22, 24, and 26 downstream to distribution node 140-2.

In this example embodiment, the distribution node 140-2 is coupled to respective ports A, B, C, D, W, X, Y, and Z of multiplexer filter resource 130-2. In a manner as previously discussed, the distribution node 140-2 receives data in the downstream direction on optical signals in channels 21, 22, 24, and 26. Distribution node 140-2 transmits data over respective optical signals in channels 19, 20, 23, and 25 in an upstream direction to content manager 140-1 in hub resource 410.

The optical channels associated with a respective block filter pair can be allocated in any suitable manner to provide access to one or more service groups in cable network environment 1200.

For example, the pair of optical channels including upstream optical signal in channel 19 and downstream optical signal in channel 21 can be allocated to support communications over communication link 650-1 (such as a coaxial cable, fiber link, etc.) between distribution node 140-2 and network 600-1 (e.g., a first service group of multiple subscribers that share use of the communication link 650-1). That is, the distribution node 140-2 can be configured to receive data from one or more subscribers over communication link 650-1 and transmit such data upstream over optical channel 19 to content manager 140-1. The distribution node 140-2 can be configured to receive data from the content manager 140-1 on an optical signal in channel 21. Distribution node 140-2 initiates transmission of the received data over communication link 650-1 to the one or more subscribers in network 600-1.

The pair of optical channels including upstream optical signal in channel 20 and downstream optical signal in channel 22 can be allocated to support communications over communication link 650-2. For example, the distribution node 140-2 can be configured to receive data from one or more subscribers in network 600-2 (e.g., a second service group of multiple subscribers that share use of the communication link 650-2) over communication link 650-2. The distribution node 140-2 transmits the received data upstream on an optical signal in channel 20 to content manager 140-1. The distribution node 140-2 can be configured to receive data from the content manager 140-1 on an optical signal in channel 22. In such an instance, distribution node 140-2 initiates transmission of the received data over communication link 650-2 to the one or more subscribers in a respective service group.

In a similar manner, a first pair of optical channels such as optical channels 28 and 34 can support communications between content manager 540-1 and network 600-2 through optical link 105 and the distribution node 540-2. A second pair of optical channels such as optical channels 33 and 35 can support communications between content manager 540-1 and network 601-2 through a portion of optical link 105 and distribution node 540-2; and so on.

In this manner, the non-limiting example configuration as discussed herein can support communications up to sixteen service groups using a single optical fiber optic link.

Thus, each content manager 140-1, 540-1, etc., in hub resource 410 can be a centralized resource configured to communicate (e.g., receive and transmit data) with multiple service groups of subscribers in disparately located networks 600 (e.g., network 600-1, network 600-2, . . . ), 601 (e.g., network 601-1, network 601-2, . . . ), etc.

Functionality supported by the different resources will now be discussed via flowcharts in FIGS. 13-14. Note that the steps in the flowcharts below can be executed in any suitable order.

Figure 13:
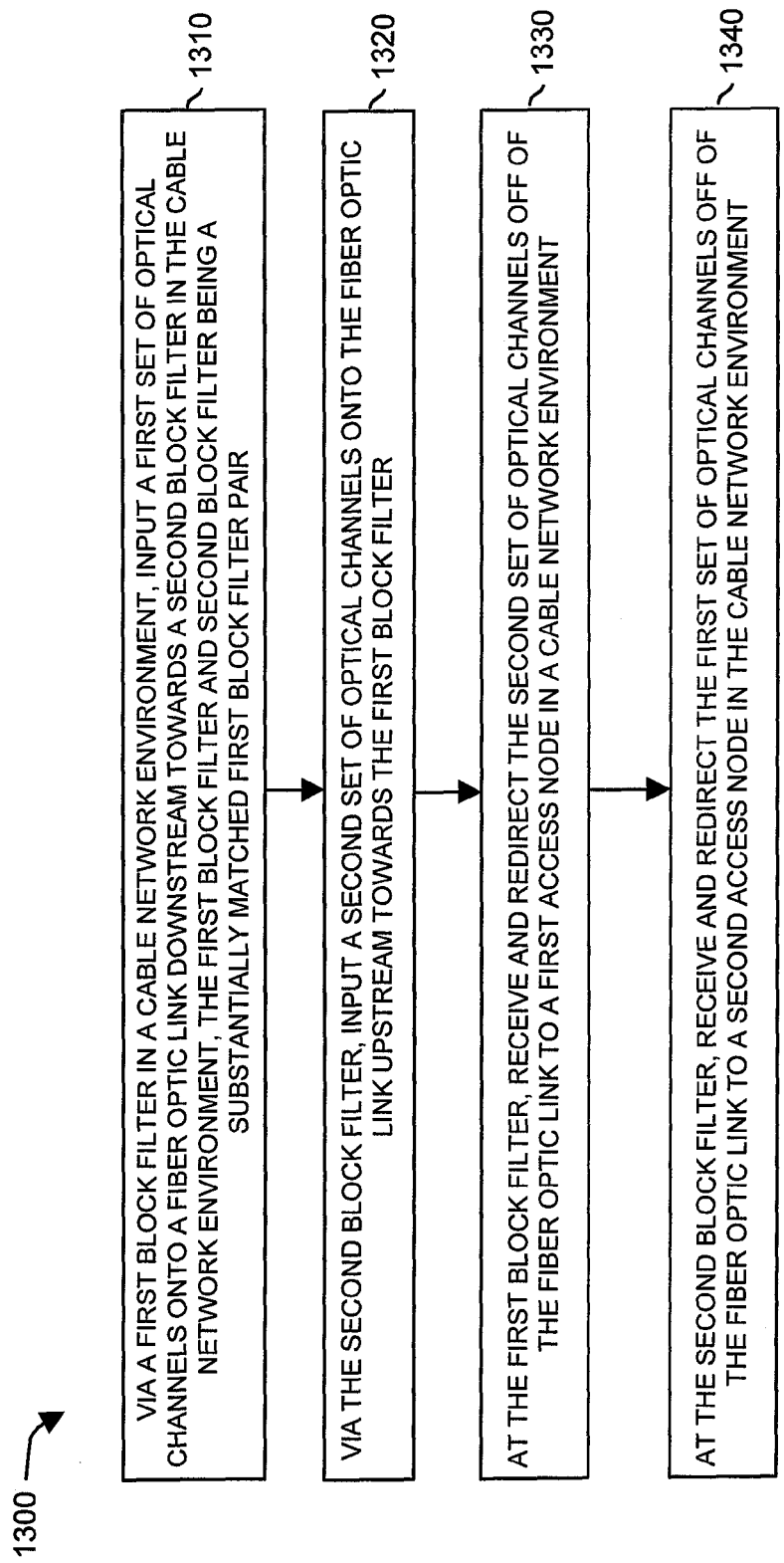
FIGS. 13 and 14 are example methods according to embodiments herein.

FIG. 13 is an example diagram illustrating an optical network environment including multiple block filters according to embodiments herein.

In processing block 1310, first block filter 120-1 disposed in cable network environment 400 inputs a first set of optical channels of signals onto a fiber optic link downstream towards a second block filter 120-2 in the cable network environment 400. The first block filter and second block filter are substantially matched; that is, the first block filter and second block filter redirect a substantially same band of optical channels of signals on and off the fiber optic link.

In processing block 1320, the second block filter 120-2 inputs a second set of optical channels of signals onto the fiber optic link upstream towards the first block filter 120-1.

In processing block 1330, the first block filter 120-1 receives and redirects the received second set of upstream optical channels of signals off of the fiber optic link to multiplexer filter resource 130-1.

In processing block 1340, the second block filter 120-2 receives and redirects the first set of downstream optical channels of signals off of the fiber optic link to multiplexer filter resource 130-2.

Figure 14:
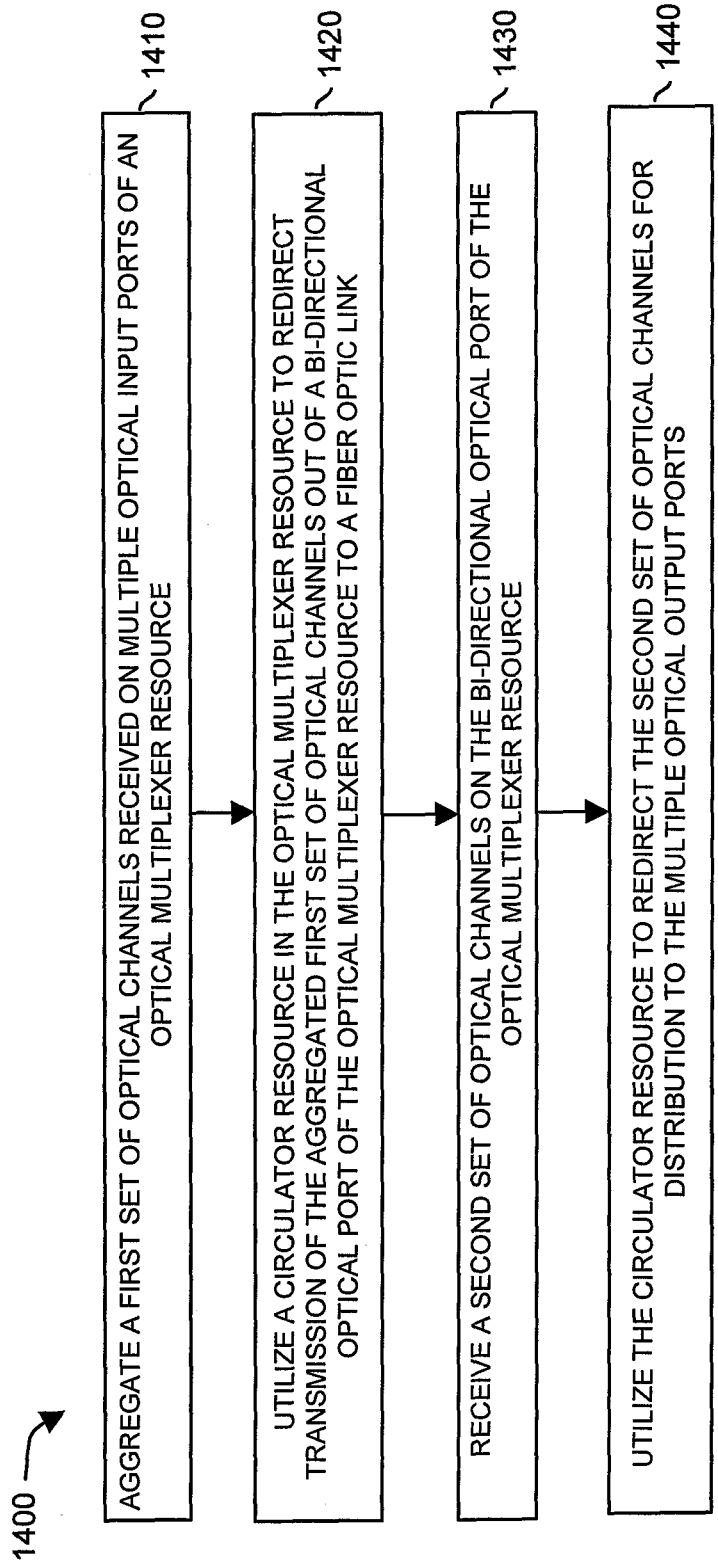

FIG. 14 is an example diagram illustrating use of block filter pairs and related resources according to embodiments herein.

In processing block 1410, the multiplexer filter resource 1030-1 aggregates a first set of optical signals on channels (e.g., 21, 22, 24, and 26) received on multiple optical input ports (e.g., ports D, C, B, and A).

In processing block 1420, the multiplexer filter resource 1030-1 utilizes a circulator resource 1020 in the multiplexer filter resource 1030-1 to redirect transmission of the aggregated first set of optical signals in channels (e.g., channels 21, 22, 24, and 26) out of a bi-directional optical port M of the optical multiplexer resource 1030-1 to a respective fiber optic link such as optical link 105. Amplifier 1050 can be used to amplify optical signals in channels 21, 22, 24, and 26 prior to transmission out of port M.

In processing block 1430, the multiplexer filter resource 1030-1 receives a second set of optical signals in channels (e.g., 19, 20, 23, and 25) as inputs to the bi-directional optical port M of the optical multiplexer resource 1030-1.

In processing block 1440, the circulator resource 1020 redirects the second set of optical signals in channels (e.g., 19, 20, 23, and 25) for distribution to a series connection of multiple optical filter resources and distribution from optical output ports W, X, Y, and Z.

Note again that techniques herein are well suited for expanding use of a optical links in a cable network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. An optical network comprising:
a fiber optic link on which to communicate;
a block filter pair including a first block filter and a second block filter disposed at disparate locations along the fiber optic link, the first block filter inputting a first set of optical carriers onto the fiber optic link downstream towards the second block filter, the second block filter inputting a second set of optical carriers onto the fiber optic link upstream towards the first block filter; and
the first block filter receiving and redirecting the second set of optical carriers off of the fiber optic link, the first block filter including an expansion port in which to expand the optical network further upstream with respect to the first block filter;
the second block filter receiving and redirecting the first set of optical carriers off of the fiber optic link, the second block filter including an expansion port in which to expand the optical network further downstream with respect to the second block filter;
wherein the first block filter receives the second set of optical carriers in the upstream direction and redirects the second set of optical carriers off of the fiber optic link to a first multiplexer resource; and
wherein the second block filter receives the first set of optical carriers in the downstream direction and redirects the first set of optical carriers off of the fiber optic link to a second multiplexer resource,
wherein the first multiplexer resource includes a bi-directional optical port, the bi-directional optical port of the first multiplexer resource outputting the first set of optical carriers from the first multiplexer resource to the first block filter, the bi-directional optical port of the first multiplexer resource receiving the second set of optical carriers from the first block filter;
wherein the second multiplexer resource includes a bi-directional optical port, the bi-directional optical port of the second multiplexer resource outputting the second set of optical carriers from the second multiplexer resource to the second block filter and receiving the first set of optical carriers from the second block filter;

wherein the first multiplexer resource includes: i) a first daisy-chain of serially connected optical input filters to receive the first set of carriers as inputs, and ii) a second daisy-chain of serially connected optical output filters to output the second set of carriers;

wherein the first daisy-chain of the first multiplexer resource communicatively couples the bidirectional optical port of the first multiplexer resource to the second daisy-chain of the first multiplexer resource, the first daisy-chain of the first multiplexer resource disposed in series with the second daisy-chain of the first multiplexer resource;

wherein the second multiplexer resource includes: i) a first daisy-chain of serially connected optical input filters to receive the second set of carriers as inputs, and ii) a second daisy-chain of serially connected optical output filters to output the first set of carriers; and wherein the first daisy-chain of the second multiplexer resource communicatively couples the bidirectional optical port of the second multiplexer resource to the second daisy-chain of the second multiplexer resource, the first daisy-chain of the second multiplexer resource disposed in series with the second daisy-chain of the second multiplexer resource.

2. The optical network as in claim 1, wherein the first daisy chain in the first multiplexer resource includes a series connection of multiple optical filters and corresponding optical ports on which to receive the first set of optical carriers and output the second set of optical carriers; and wherein the second daisy chain in the second multiplexer filter resource includes a series connection of multiple optical filters and corresponding optical ports on which to receive the second set of optical carriers and output the first set of optical carriers.

3. The optical network as in claim 2, wherein the first multiplexer resource and the second multiplexer resource each include a substantially same set of configured optical filters, each of which is configured to redirect a unique optical carrier; and wherein an ordering of wavelength channels assigned to the optical filters in the first daisy chain of the first filter resource is opposite an ordering of the wavelength channels assigned to the optical filters in the second daisy chain of the second multiplexer resource.

4. The optical network as in claim 1, wherein the first block filter redirects the second set of optical carriers received in an upstream direction on the fiber optic link out of the bi-directional optical port of the first block filter; and wherein the second block filter redirects the first set of optical carriers received in a downstream direction of the fiber optic link out of the bi-directional optical port of the second block filter.

5. The optical network as in claim 4, wherein the first block filter passes optical carriers, other than the second set of carriers, received in the upstream direction on the fiber optic link further upstream on the fiber optic link through the expansion port of the first block filter; and wherein the second block filter passes optical carriers, other than the first set of optical carriers, received in the downstream direction on the fiber optic link further downstream on the fiber optic link through the expansion port of the second block filter.

6. The optical network as in claim 1, wherein the first set of optical carriers and the second set of optical carriers are modulated as linear analog carriers.

7. The optical network as in claim 1, wherein the block filter pair is a first block filter pair, the optical network comprising:

a second block filter pair including a third block filter and a fourth block filter disposed at disparate locations along the fiber optic link, the third block filter coupled to the expansion port of the first block filter, the fourth block filter coupled to the expansion port of the second block filter;

the third block filter inputting a third set of carriers onto the fiber optic link downstream through the first block filter and the second block filter towards the fourth block filter, the fourth block filter inputting a fourth set of carriers onto the fiber optic link upstream through the second block filter and the first block filter towards the third block filter; and the third block filter redirecting the third set of carriers off of the fiber optic link to a third multiplexer resource, the fourth block filter redirecting the fourth set of carriers off of the fiber optic link to a fourth multiplexer resource.

8. The optical network as in claim 7, wherein the first block filter and the third block filter are disposed in a same distribution building of a shared cable network environment; and wherein the second block filter and fourth block filter reside external to the distribution building, the second block filter and the fourth block filter disparately located with respect to each other.

9. The optical network as in claim 1, wherein the first set of carriers includes a first carrier and a second carrier;

wherein the first carrier and the second carrier pass through an equal number of optical filters between a respective input port of the first multiplexer resource and a respective output port of the second multiplexer resource;

wherein the second set of carriers includes a third carrier and a fourth carrier;

wherein the third carrier and the fourth carrier pass through an equal number of optical filters between a respective input port of the second multiplexer resource and a respective output port of the first multiplexer resource.

10. The optical network as in claim 9, wherein wavelengths of optical carriers in the first set are interleaved among and unique with respect to wavelengths of optical carriers in the second set.

11. An optical network comprising:

a fiber optic link on which to communicate;

a block filter pair including a first block filter and a second block filter disposed at disparate locations along the fiber optic link, the first block filter inputting a first set of optical carriers onto the fiber optic link downstream towards the second block filter, the second block filter inputting a second set of optical carriers onto the fiber optic link upstream towards the first block filter; and the first block filter receiving and redirecting the second set of optical carriers off of the fiber optic link, the first block filter including an expansion port in which to expand the optical network further upstream with respect to the first block filter;

the second block filter receiving and redirecting the first set of optical carriers off of the fiber optic link, the second block filter including an expansion port in which to expand the optical network further downstream with respect to the second block filter;

a third multiplexer resource, the third multiplexer resource coupled to the expansion port of the first block filter, the third multiplexer resource receiving a third set of carriers and transmitting the third set of carriers downstream through the first block filter and the second block filter to the fourth filter resource;

a fourth multiplexer resource, the fourth multiplexer resource coupled to the expansion port of the second block filter, the fourth multiplexer resource receiving a fourth set of carriers and transmitting the fourth set of carriers upstream through the second block filter and the first block filter to the third filter resource; and termination of the expansion port of the first block filter with the third multiplexer resource preventing further expansion of the optical network upstream with respect to the first block filter, termination of the expansion port of the second block filter with the fourth multiplexer resource preventing further expansion of the optical network downstream with respect to the second block filter.

12. The optical network as in claim 11, wherein the first block filter redirects optical carriers within a first block wavelength range received in the upstream direction off the fiber optic link to a first multiplexer resource, the second set of optical carriers residing in the first block wavelength range; and wherein the second block filter redirects optical carriers within the first block wavelength range received in the downstream direction off the fiber optic link to a second multiplexer resource, the second set of optical carriers included in the first block wavelength range.

13. The optical network as in claim 12, wherein the first multiplexer resource comprises:

multiple optical input ports to receive the first set of optical carriers;

multiple optical output ports to output the second set of optical carriers;

a bi-directional optical port; and a circulator resource, the circulator resource receiving the first set of optical carriers received on the multiple optical input ports and directing transmission of the first set of optical carriers out of the bi-directional optical port to the first block filter, the circulator resource receiving the second set of optical carriers as inputs to the bi-directional optical port from the first block filter and directing the second set of optical carriers to the optical output ports.

14. The optical network as in claim 13, wherein the first multiplexer resource further comprises:

an optical amplifier resource disposed between the multiple optical input ports and the circulator resource, the optical amplifier resource amplifying the first set of optical carriers received on the multiple optical input ports, the circulator resource directing the amplified first set of optical carriers out of the bi-directional optical port, the first block filter transmitting the amplified first set of optical carriers downstream on the fiber optic link towards the second block filter.

15. The optical network as in claim 13, wherein the first multiplexer resource further comprises:

a sequence of serially connected optical input filters on which to receive the first set of optical carriers from the optical input ports, the sequence of serially connected optical input filters outputting the first set of optical carriers to the circulator resource; and a sequence of serially connected optical output filters on which to receive the second set of optical carriers from the circulator resource, the sequence of serially connected optical output filters outputting the second set of optical carriers received from the circulator resource.

16. The optical network as in claim 15, wherein the first set of optical carriers includes at least a first optical carrier and a second optical carrier;

wherein the multiple optical input ports includes at least a first optical input port and a second optical input port; and wherein the sequence of serially connected optical input filters includes at least a first optical input filter and a second optical input filter: the first optical input filter receiving the first optical carrier from the first optical input port and transmitting the first optical carrier to the second optical input filter, the second optical input filter receiving the first optical carrier from the first optical input filter and receiving the second optical carrier from the second optical input port, the second optical input filter transmitting the first optical carrier and the second optical carrier towards the circulator resource.

17. The optical network as in claim 16, wherein the second set of optical carriers received on the bi-directional port includes at least a third optical carrier and a fourth optical carrier;

wherein the multiple optical output ports includes at least a first optical output port and a second optical output port; and wherein the sequence of serially connected optical output filters includes at least a first optical output filter and a second optical output filter: the first optical output filter receiving at least the third optical carrier and fourth optical carrier from the circulator resource, the first optical output filter redirecting the third optical carrier out of the first optical output port and transmitting the fourth optical carrier to the second optical output filter, the second optical output filter redirecting the fourth optical carrier out of the second optical output port.

18. The optical network as in claim 13, wherein the first multiplexer resource is a distribution node in a cable network environment, at least one of the optical carriers in the first set assigned to convey encoded information to at least one subscriber in a service group of the cable network environment, at least one of the optical carriers in the second set assigned to receive encoded information from the at least one subscriber in the service group.

19. The optical network as in claim 11, wherein the first block filter receives the second set of optical carriers in the upstream direction and redirects the second set of optical carriers off of the fiber optic link to a first multiplexer resource; and wherein the second block filter receives the first set of optical carriers in the downstream direction and redirects the first set of optical carriers off of the fiber optic link to a second multiplexer resource.

20. The optical network as in claim 19, wherein the first multiplexer resource includes a bi-directional optical port, the bi-directional optical port of the first multiplexer resource outputting the first set of optical carriers from the first multiplexer resource to the first block filter, the bi-directional optical port of the first multiplexer resource receiving the second set of optical carriers from the first block filter; and wherein the second multiplexer resource includes a bi-directional optical port, the bi-directional optical port of the second multiplexer resource outputting the second set of optical carriers from the second multiplexer resource to the second block filter and receiving the first set of optical carriers from the second block filter.

21. The optical network as in claim 11, wherein the first block filter includes:

a first sequence of individual optical filters and a second sequence of individual optical filters, the first sequence of individual optical filters including optical input ports to receive the first set of carriers, the second sequence of the individual optical filter including optical output ports to output the second set of carriers from the first block filter.

22. The optical network as in claim 11, wherein the third multiplexer resource includes a series connection of multiple optical filters and corresponding optical ports on which to: i) receive the third set of optical carriers and output the third set of optical carriers downstream through the expansion port of the first block filter, and ii) output the fourth set of optical carriers received from the expansion port of the first block filter; and wherein the fourth multiplexer resource includes a series connection of multiple optical filters and corresponding optical ports on which to: i) receive the fourth set of optical carriers and output the fourth set of optical carriers upstream through the expansion port of the second block filter, and ii) output the third set of optical carriers received from the expansion port of the second block filter.

* * * * *